US010059397B2

United States Patent
Zheng et al.

(10) Patent No.: US 10,059,397 B2
(45) Date of Patent: Aug. 28, 2018

(54) SELF-BALANCING VEHICLE WITH GRAVITY CONTROL

(71) Applicants: Hui Zheng, Irvine, CA (US); Deyi Pi, Irvine, CA (US); Bingqiang Zhu, Irvine, CA (US)

(72) Inventors: Hui Zheng, Irvine, CA (US); Deyi Pi, Irvine, CA (US); Bingqiang Zhu, Irvine, CA (US)

( * ) Notice: Subject to any disclaimer, the term of this patent is extended or adjusted under 35 U.S.C. 154(b) by 281 days.

(21) Appl. No.: 15/130,914

(22) Filed: Apr. 15, 2016

(65) Prior Publication Data

US 2017/0297653 A1 Oct. 19, 2017

(51) Int. Cl.
| | |
|---|---|
| *B62K 7/00* | (2006.01) |
| *B62K 3/00* | (2006.01) |
| *B62D 11/00* | (2006.01) |
| *B62K 21/12* | (2006.01) |
| *B62J 25/00* | (2006.01) |
| *B62M 7/12* | (2006.01) |

(52) U.S. Cl.
CPC ............ *B62K 3/007* (2013.01); *B62D 11/003* (2013.01); *B62J 25/00* (2013.01); *B62K 3/002* (2013.01); *B62K 21/12* (2013.01); *B62M 7/12* (2013.01); *B62K 2202/00* (2013.01); *B62K 2207/00* (2013.01)

(58) Field of Classification Search
None
See application file for complete search history.

(56) References Cited

U.S. PATENT DOCUMENTS

| | | | | |
|---|---|---|---|---|
| D601,922 S | * | 10/2009 | Imai | ................................ D12/1 |
| 8,225,891 B2 | * | 7/2012 | Takenaka | ............. B62K 11/007 |
| | | | | 180/7.1 |
| 8,738,278 B2 | * | 5/2014 | Chen | .................... B62K 11/007 |
| | | | | 180/218 |
| 9,400,502 B2 | * | 7/2016 | Kamen | .................. A63C 17/01 |
| 9,511,811 B2 | * | 12/2016 | Andreev | ................ B60G 21/05 |
| D807,457 S | * | 1/2018 | Desberg | ....................... D21/763 |
| 2004/0005958 A1 | * | 1/2004 | Kamen | .................... A61G 5/04 |
| | | | | 482/51 |
| 2004/0262871 A1 | * | 12/2004 | Schreuder | ............... B60P 3/007 |
| | | | | 280/87.1 |
| 2006/0202439 A1 | * | 9/2006 | Kahlert | .................. B62D 61/00 |
| | | | | 280/47.24 |
| 2008/0029985 A1 | * | 2/2008 | Chen | .................. A63C 17/0033 |
| | | | | 280/87.042 |

(Continued)

*Primary Examiner* — Jonathan M Dager

(57) ABSTRACT

A two-wheel, self-balancing vehicle comprises a first wheel and a second wheel, spaced apart and substantially parallel to one another; a foot placement section connecting the first wheel and the second wheel; a set of position sensors in the foot placement section, the set of position sensors configured to generate inclination angle signals and velocity signals of the two-wheel, self-balancing vehicle; a first gravity sensor and a second gravity sensor in the foot placement section, the first gravity sensor and the second gravity sensor configured to generate weight signals and gravity angle signals. In addition, the two-wheel, self-balancing vehicle comprises a control logic configured to output control signals that control the movement of the two-wheel, self-balancing vehicle in response to the inclination angle signals, the velocity signals, the weight signals, and the gravity angle signals.

14 Claims, 21 Drawing Sheets

(56) References Cited

U.S. PATENT DOCUMENTS

| | | | |
|---|---|---|---|
| 2008/0147281 A1* | 6/2008 | Ishii | B62D 51/005 701/49 |
| 2009/0032323 A1* | 2/2009 | Kakinuma | A63C 17/08 180/218 |
| 2009/0078485 A1* | 3/2009 | Gutsch | A01D 34/67 180/218 |
| 2009/0105908 A1* | 4/2009 | Casey | A63C 17/08 701/41 |
| 2010/0025139 A1* | 2/2010 | Kosaka | B62D 61/00 180/218 |
| 2010/0114468 A1* | 5/2010 | Field | B60N 2/045 701/124 |
| 2010/0222994 A1* | 9/2010 | Field | A63C 17/01 701/124 |
| 2010/0237645 A1* | 9/2010 | Trainer | G09F 15/0087 296/21 |
| 2011/0209929 A1* | 9/2011 | Heinzmann | B62K 11/007 180/6.2 |
| 2011/0220427 A1* | 9/2011 | Chen | B62K 1/00 180/21 |
| 2011/0221160 A1* | 9/2011 | Shaw | B60L 7/12 280/205 |
| 2011/0238247 A1* | 9/2011 | Yen | B62H 1/12 701/22 |
| 2012/0205176 A1* | 8/2012 | Ha | B62H 1/00 180/220 |
| 2013/0032422 A1* | 2/2013 | Chen | 180/218 |
| 2013/0032423 A1* | 2/2013 | Chen | A63C 17/0073 180/218 |
| 2013/0105239 A1* | 5/2013 | Fung | H04N 7/142 180/218 |
| 2013/0228385 A1* | 9/2013 | Chen | B62K 3/007 180/6.5 |

* cited by examiner

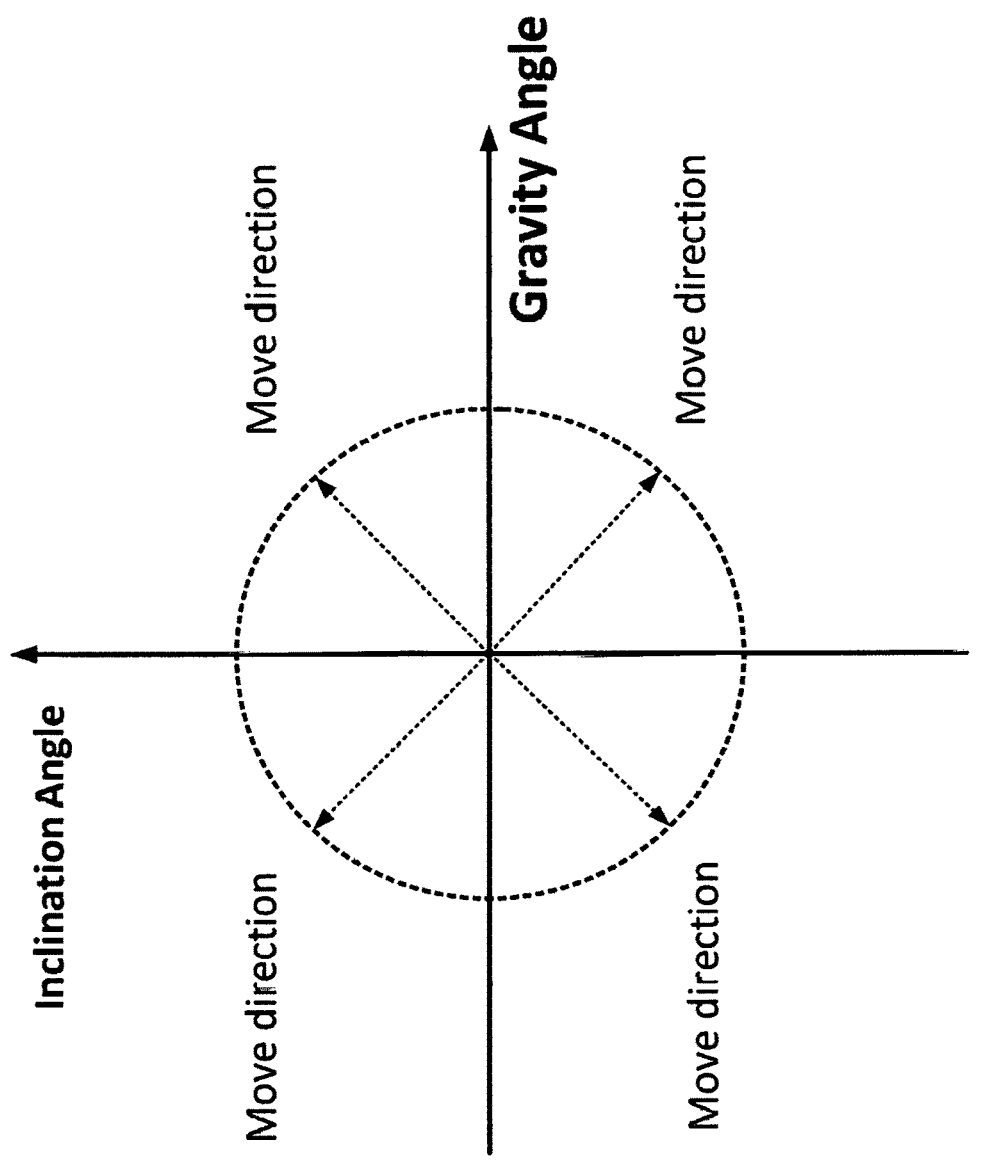

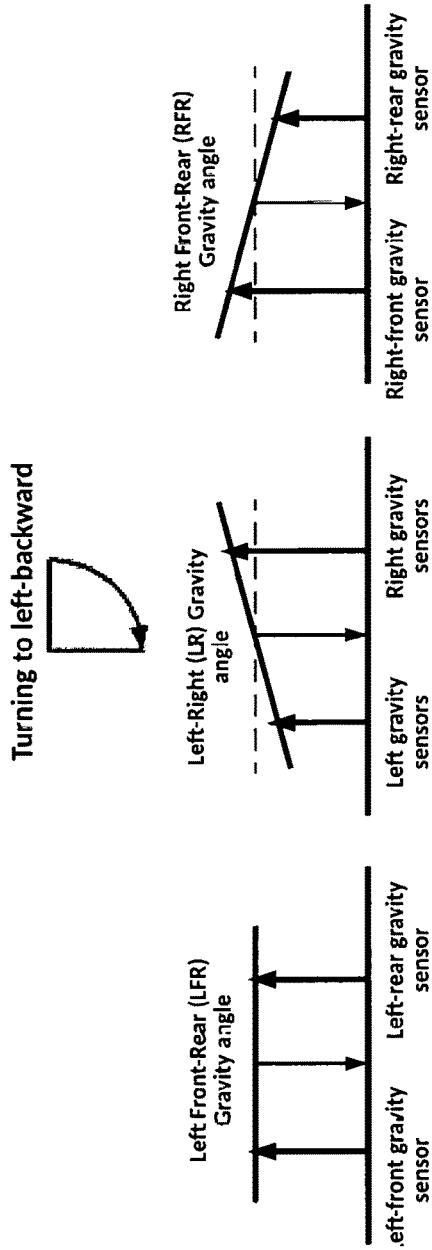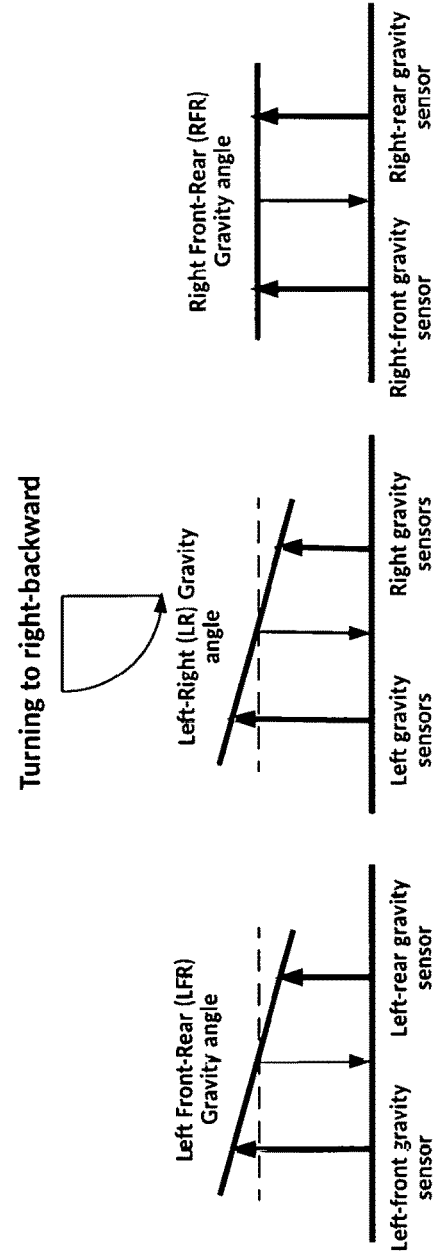
FIG. 16C
FIG. 16D

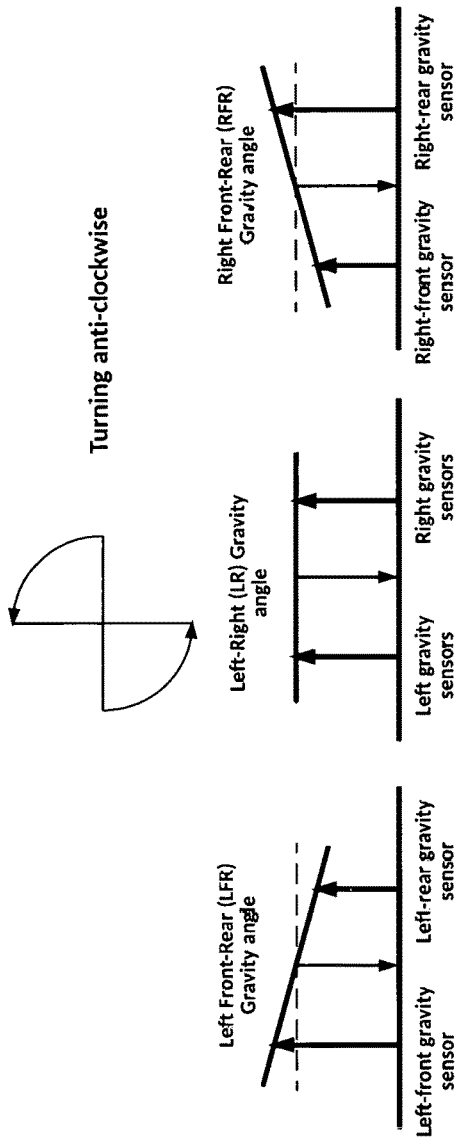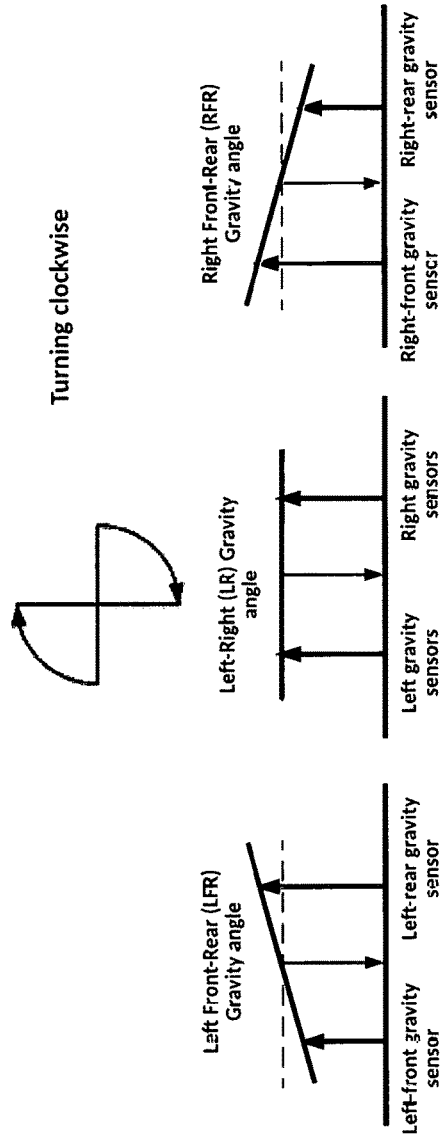
FIG. 16E
FIG. 16F

SELF-BALANCING VEHICLE WITH GRAVITY CONTROL

TECHNICAL FIELD

The present disclosure relates to self-balancing vehicles and methods for controlling the self-balancing vehicles.

BACKGROUND

In some aspects, self-balancing vehicles are controlled through a yaw or steering control structure. For example, turning of the self-balancing vehicles may be achieved through a handle bar structure that ascends from the platform upward toward the chest of a user. FIG. 1 illustrates one example of a conventional two-wheel self-balancing vehicle with a yaw or steering control structure. The conventional two-wheel self-balancing vehicle with a yaw or steering control structure utilizes a control principle of a single inverted pendulum system.

As shown in FIG. 1, a two-wheel self-balancing vehicle 100 with a yaw or steering control structure comprises a first wheel with direct current (DC) motor 10, a second wheel with DC motor 12, a foot placement section 14 and a yaw or steering control structure 16. With two parallel wheels controlled independently by two DC motors, two-wheel self-balancing vehicle 100 can move forward, backward, and make relatively stable turns. The maximum moving speed of two-wheel self-balancing vehicle 100 could be up to 10 miles per hour. To operate two-wheel self-balancing vehicle 100, a user may stand on foot placement section 14, and the user's feet are separated to left and right. Foot placement section 14 may be one section or area affixed to first wheel with DC motor 10 and second wheel with DC motor 12. Foot placement section 14 may comprise a first portion 11 and a second portion 13 located on the same plane. Yaw or steering control structure 16 may comprise a handle bar structure, including for example, a grip, a handle, and/or a pole.

By sloping forward or leaning backward the user's body, the user can control two-wheel self-balancing vehicle 100 to accelerate or decelerate. A left turn or a right turn may be accomplished by sending the turn signals through yaw or steering control structure 16. One of the disadvantages of this design is that with yaw or steering control structure 16, two-wheel self-balancing vehicle 100 is larger and heavier than a vehicle without a central control structure (e.g., a handle bar structure). The user also has to exert hand control using yaw or steering control 16.

FIG. 2 illustrates one example of a control diagram 200 of two-wheel self-balancing vehicle 100. As shown in FIG. 2, micro-electro-mechanical systems (MEMS) sensors, such as an accelerometer and a gyroscope may be used to detect the inclination angle of foot placement section 14. The inclination angle of foot placement section 14 may be used in combination with yaw or steering control input from yaw or steering control structure 16 as input signals to a proportional-integral-derivative (PID) control and driving control of two-wheel self-balancing vehicle 100.

FIG. 3 illustrates an embodiment showing the inclination angle of foot placement section 14 of two-wheel self-balancing vehicle 100. As shown in FIG. 3, when foot placement section 14 is tilted down or up by the user, the accelerometer and gyroscope sensor sense the motion and calculate the inclination angle. The inclination angle information, after being compared with a desired balance angle, may be sent to the PID and center control unit. Together with the yaw and steering control input, DC motor control signals may be generated and sent to a driver to control the movement of first wheel with DC motor 10 and second wheel with DC motor 12 to maintain the balance of two-wheel self-balancing vehicle 100. For signal processing purpose, the PID and center control unit may also receive the current speed information from first wheel with DC motor 10 and second wheel with DC motor 12, and the current information from drivers.

In this implementation, two-wheel self-balancing vehicle 100 may suffer from their large size and dimensions of the yaw or steering structure, which may be required to handle the vehicle's turn movement. This may result in the vehicle's incapability to turn surrounding its own center of gravity.

In some aspects, self-balancing vehicles have two platform sections or areas that areas that are independently movable with respect to one another and that thereby provide independent control and/or drive of the wheel associated with the given platform section/area. The angle control of self-balancing vehicles have two platform sections or areas can be achieved by measuring the angle difference between the left and right sides' angle difference, thus eliminating the need for a structure for controlling.

FIG. 4 illustrates an example of a two-wheel self-balancing vehicle 400 having independently movable foot placement sections. In this embodiment, a first foot placement section 42 and a second foot placement section 44 can move independently from each other, which may eliminate the need of a yaw and steeling control structure, and make space for the center space between the left side of second foot placement section 44 and the right side of first foot placement section 42. A first sensor and control module, which includes an accelerometer and a first gyroscope, may be required on first foot placement section 42 sense the tilted angle of first foot placement section 42. A second sensor and control module, which includes an accelerometer and a first gyroscope, may be required on second foot placement section 44 to sense the tilted angle of second foot placement section 44.

FIG. 5 illustrates an embodiment of a control diagram of a two-wheel self-balancing vehicle having independently movable foot placement sections. As illustrated in FIG. 5, the yaw angle information may be extracted from the tilted angle information obtained from the first sensor and control module and second sensor and control module, as described with reference to FIG. 4. FIG. 6 illustrates an embodiment showing an example of turning movement examples of a two-wheel self-balancing vehicle having independently movable foot placement sections. FIG. 6 illustrates one or more turn movement examples by operating first foot placement section 42 and second foot placement section 44 separately.

However, since each of first foot placement section 42 and second foot placement section 44 moves independently around a center axis of the two-wheel self-balancing vehicle having independently movable foot placement sections, constrains may be introduced to the mechanical design as well as the exterior design of the vehicle. In addition, users operating two-wheel self-balancing vehicle 400 having independently movable foot placement sections would find it difficult to circle around a center point of gravity that is the user himself or herself. Additionally, because first foot placement section 42 and second foot placement section 44 are separated, the center portion between first foot placement section 42 and second foot placement section 44 cannot hold any additional functionalities or accessories. Furthermore, the design of the two-wheel self-balancing vehicle having independently movable foot placement sections also introduces additional costs due to, for example, first foot placement section 42 and second foot placement section 44 being separated.

SUMMARY

A two-wheel, self-balancing vehicle is disclosed. In one aspect, the two-wheel, self-balancing vehicle comprises a first wheel and a second wheel, the first wheel and the second wheel being spaced apart and substantially parallel to one another. The two-wheel, self-balancing vehicle further comprises a foot placement section connecting the first wheel and the second wheel. The two-wheel, self-balancing vehicle further comprises a set of position sensors in the foot placement section, the set of position sensors configured to generate inclination angle signals and velocity signals of the two-wheel, self-balancing vehicle. The two-wheel, self-balancing vehicle further comprises a first gravity sensor and a second gravity sensor in the foot placement section, the first gravity sensor and the second gravity sensor configured to generate weight signals and gravity angle signals. In addition, the two-wheel, self-balancing vehicle comprises a control logic configured to output control signals that control the movement of the two-wheel, self-balancing vehicle in response to the inclination angle signals, the velocity signals, the weight signals, and the gravity angle signals.

In some embodiments, the set of position sensors comprises an accelerometer sensor and a gyroscope sensor. In some embodiments, the first gravity sensor is located in the left part of the foot placement section and the second gravity sensor is located in the right part of the foot placement section. In some embodiments, the control logic is configured to compare a desired balance angle of the two-wheel, self-balancing vehicle with the inclination angle signals. In some embodiments, the desired balance angle is a function of a speed of the first wheel or the second wheel.

In some embodiments, the center portion of the foot placement section is attached to at least one sensor or at least one accessory. In some embodiments, the at least one sensor includes at least one of a temperature sensor, a light sensor, a moisture sensor, or a location sensor. In some embodiments, the at least one accessory includes at least one of a camera, a camera mount, or a storage component. In some embodiments, a pole is attached to the center portion of the foot placement section. In some embodiments, the foot placement section comprises one generally flat plane with room for accommodating two human feet. In some embodiments, each of the first gravity sensor and the second gravity sensor senses a pressure of a human foot placed on the foot placement section.

In some embodiments, the two-wheel, self-balancing vehicle further comprises a third gravity sensor and a fourth gravity sensor, wherein the first gravity sensor is located at the left front part of the foot placement section, the second gravity sensor is located at the left rear part of the foot placement section, the third gravity sensor is located at the right front of the foot placement section, and the fourth gravity sensor is located at the right rear of the foot placement section. In some embodiments, the first, second, third and fourth gravity sensors are configured to generate three-dimensional gravity angle signals. In some embodiments, the two-wheel, self-balancing vehicle further comprises a gravity sensor array located in the left part of the foot placement section or the right part of the foot placement section.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIG. 11 illustrates diagrammatically of movement control of the wheels of the embodiment of FIGS. 10A-10D.

FIGS. 16A-16F illustrate turning control examples of a two-wheel self-balancing vehicle with one or more gravity sensors shown in FIG. 14.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As described above, two-wheel self-balancing vehicle 100 may suffer from their large size and dimensions of the yaw or steering structure, which may be required to handle the vehicle's turn movement. This may result in the vehicle's incapability to turn surrounding its own center of gravity. In addition, two-wheel self-balancing vehicle 400 having independently movable foot placement sections may be constrains with the mechanical design as well as the exterior design of the vehicle. In addition, a user who operates two-wheel self-balancing vehicle 400 having independently movable foot placement sections would find it difficult to circle around a center point of gravity that is the user himself or herself. Additionally, because first foot placement section 42 and second foot placement section 44 are separated, the center portion between first foot placement section 42 and second foot placement section 44 cannot hold any additional functionalities or accessories. Furthermore, the design of the two-wheel self-balancing vehicle having independently movable foot placement sections also introduces additional costs due to, for example, first foot placement section 42 and second foot placement section 44 being separated. Thus, there is a need for a two-wheel self-balancing vehicle with one foot placement section, but at the same time eliminate a yaw and steeling control structure.

Figure 1:
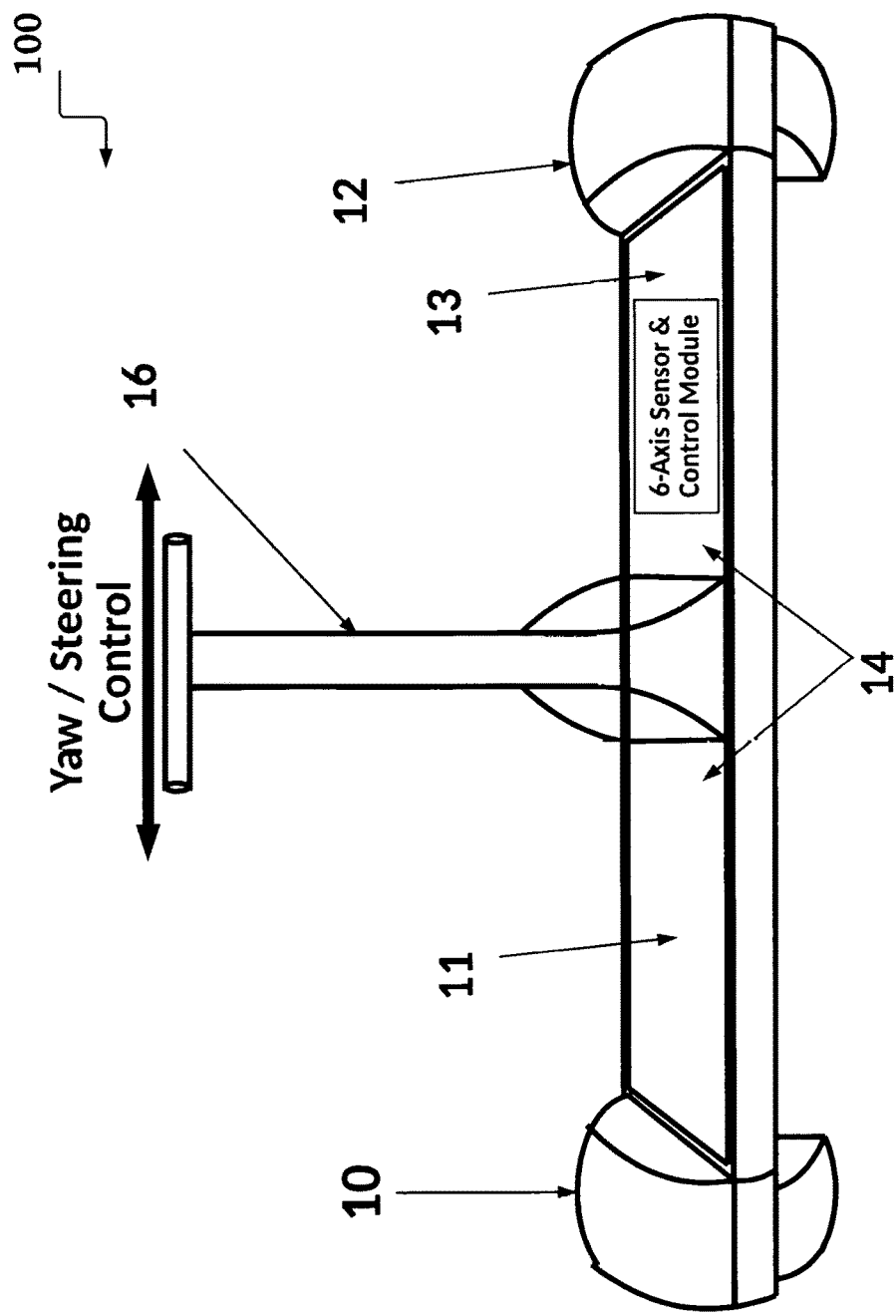
FIG. 1 illustrates one example of a conventional two-wheel self-balancing vehicle with a yaw or steering control structure.
Figure 2:
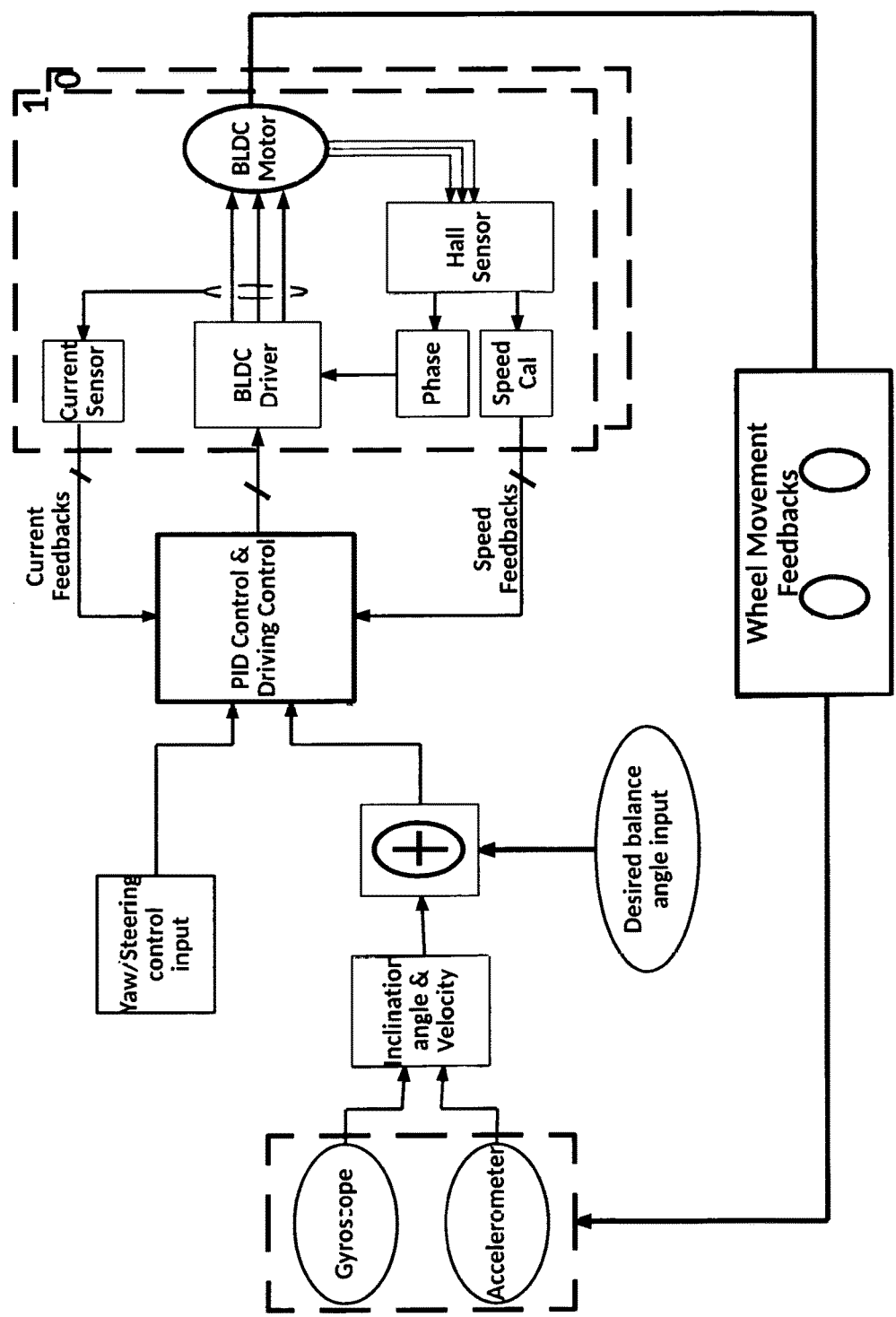
FIG. 2 illustrates one example of a control diagram of the two-wheel self-balancing vehicle shown in FIG. 1.
Figure 3:
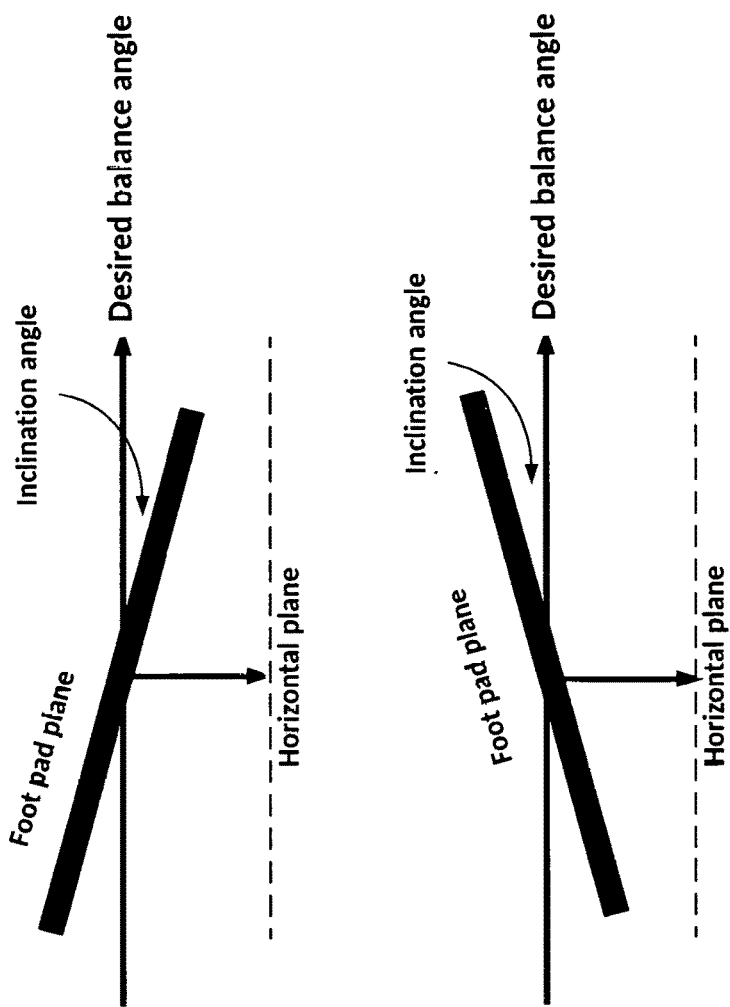
FIG. 3 illustrates an embodiment showing the inclination angle of foot placement section of two-wheel self-balancing vehicle shown in FIG. 1.
Figure 4:
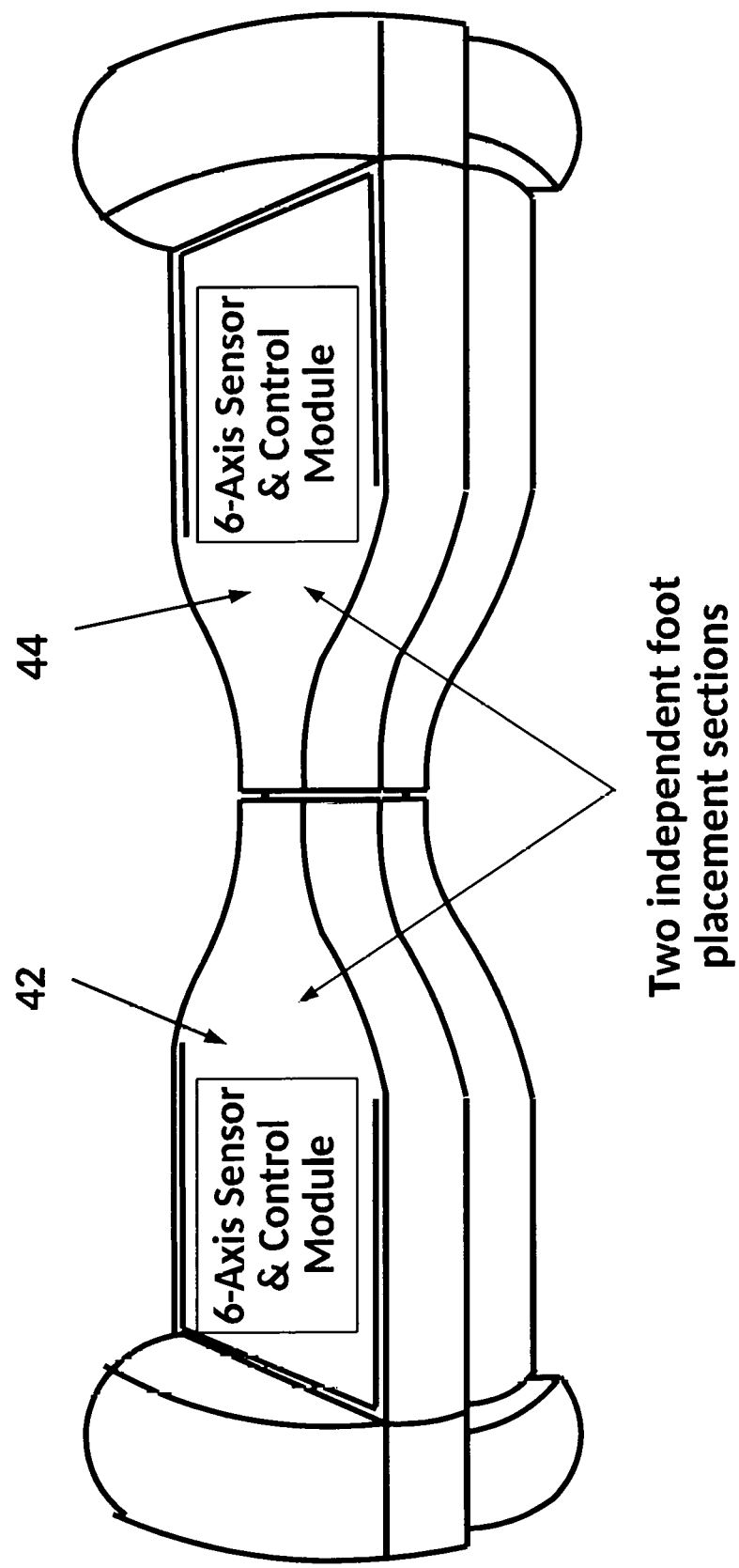
FIG. 4 illustrates an example of a two-wheel self-balancing vehicle having independently movable foot placement sections.
Figure 5:
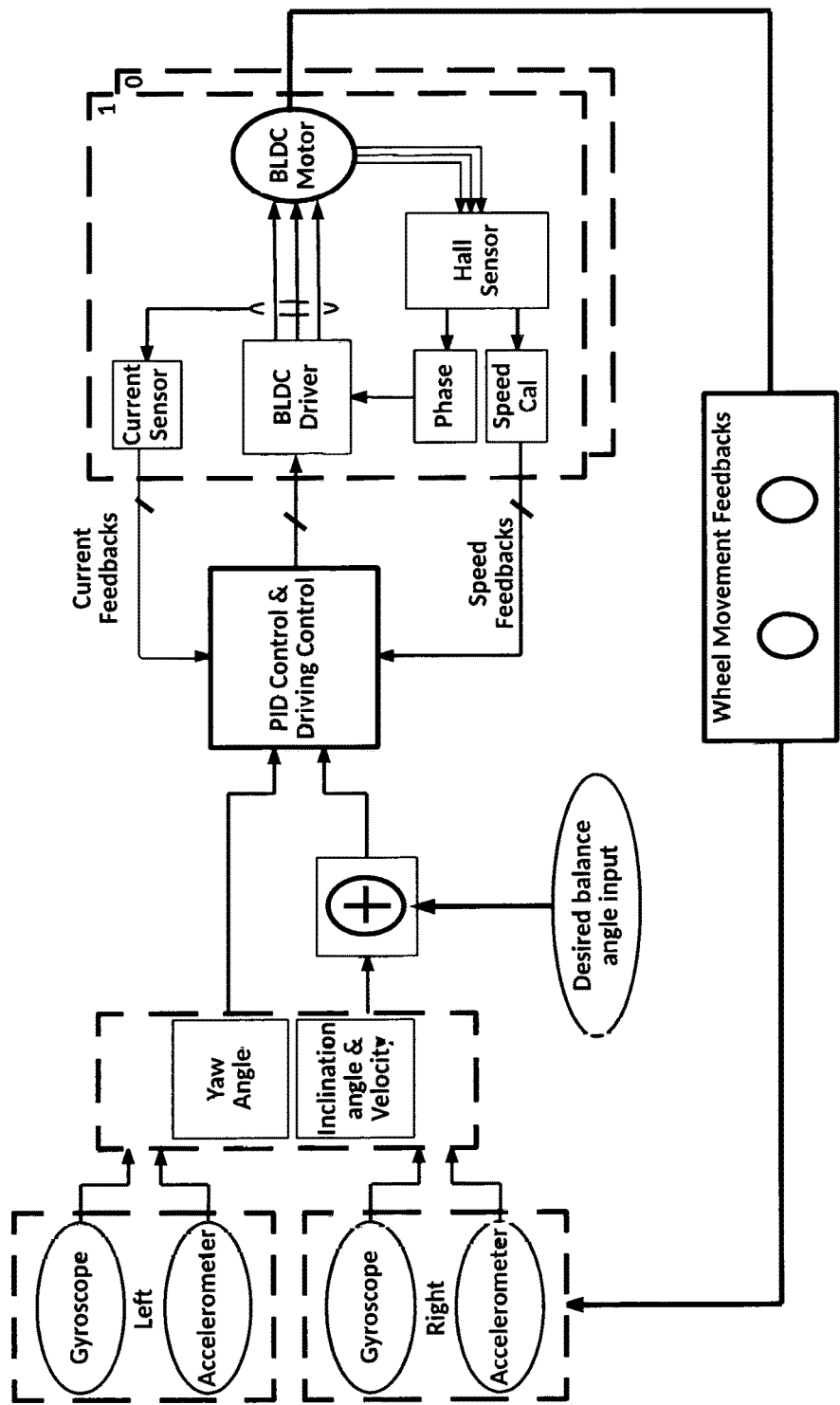
FIG. 5 illustrates an embodiment of a control diagram of a two-wheel self-balancing vehicle having independently movable foot placement sections.
Figure 6:
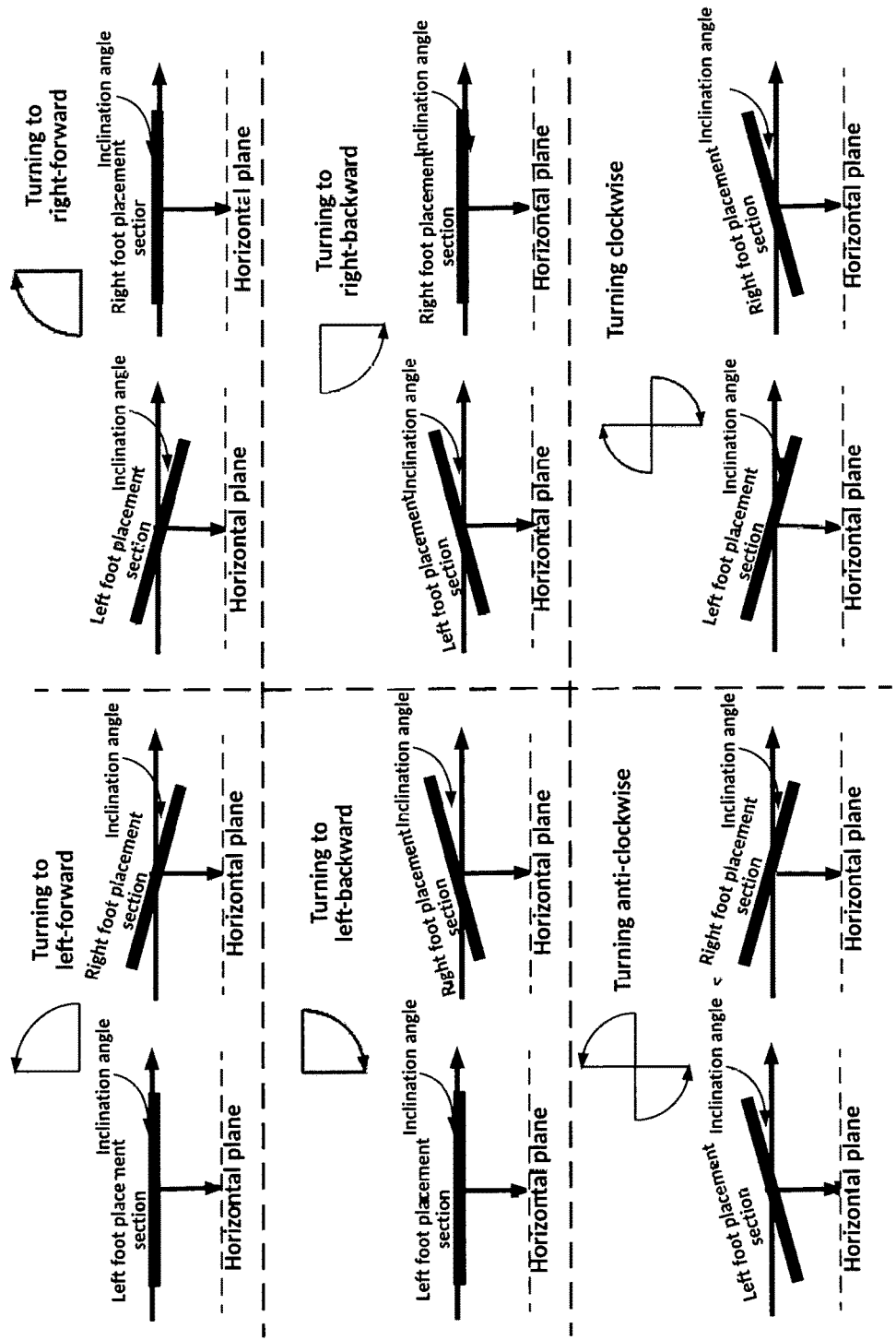
FIG. 6 illustrates one or more turn movement examples by operating first foot placement section and second foot placement section separately.
Figure 7:
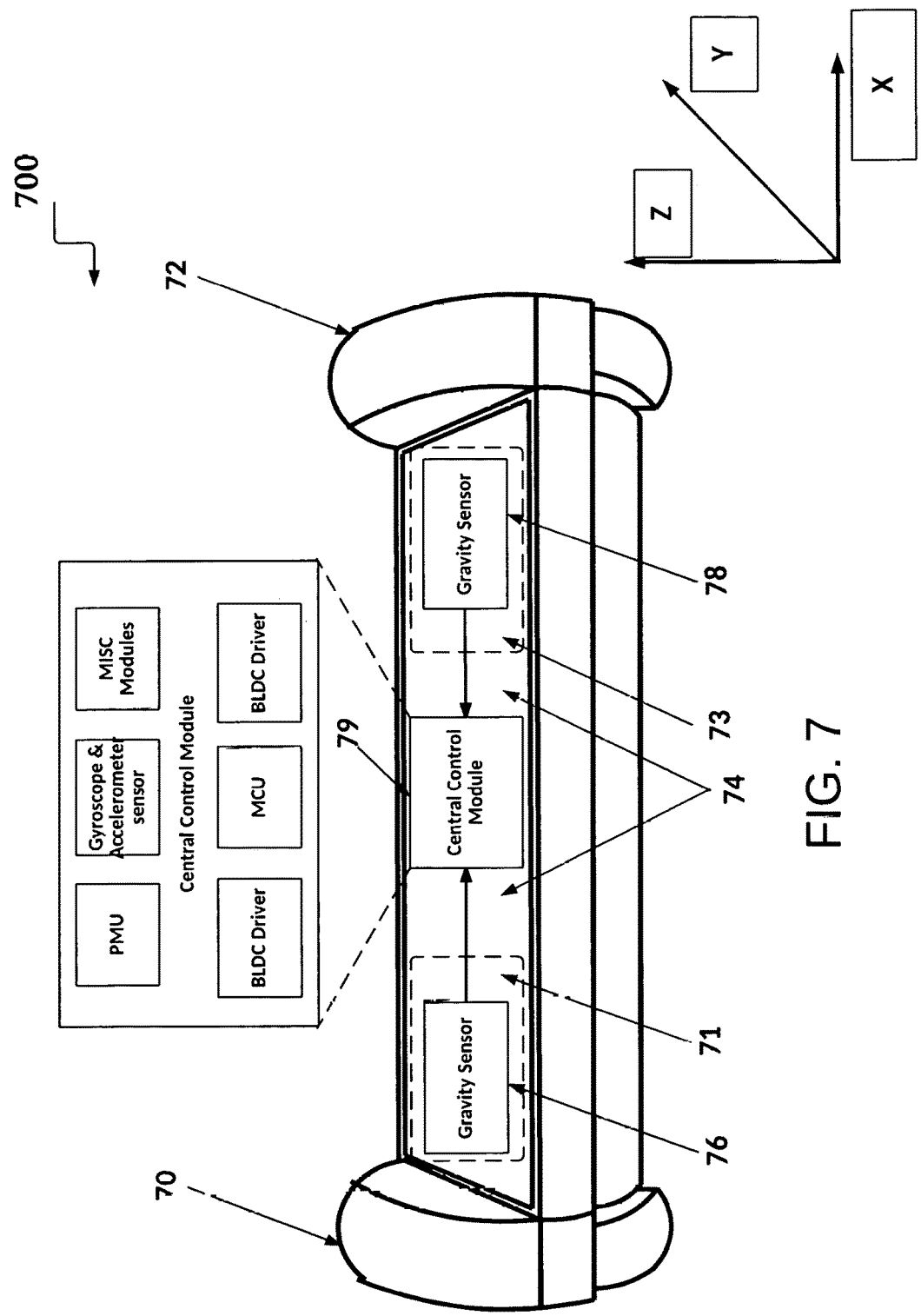
FIG. 7 illustrates an example of a two-wheel self-balancing vehicle with one or more gravity sensors according to one embodiment of the present disclosure.

FIG. 7 illustrates an example of a two-wheel self-balancing vehicle 700 with one or more gravity sensors according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Two-wheel self-balancing vehicle 700 with one or more gravity sensors comprises a first wheel with DC motor 70, a second wheel with DC motor 72, a foot placement section 74, a first gravity sensor 76, a second gravity sensor 78, and a central control module 79.

In some embodiments, foot placement section 74 may be one section or area comprising a first portion 71 and a second portion 73 located on the same plane to offer more design flexibility in terms of mechanical architecture and exterior design. In some aspects, first portion 71 may be a portion between the center axes of two-wheel self-balancing vehicle 700 with one or more gravity sensors and first wheel with DC motor 70. Second portion 73 may be a portion between the center axes of two-wheel self-balancing vehicle 700 with one or more gravity sensors and second wheel with DC motor 72. For example, a user may place his/her left foot on first portion 71 and his/her right foot on second portion 73.

In some embodiments, first portion 71 may include first gravity sensor 76 and second portion 73 may include second gravity sensor 78. First gravity sensor 76 and second gravity sensor 78 may sense the weight and gravity angles of a user when he or she stands on foot placement section 74. Each of first gravity sensor 76 and second gravity sensor 78 may be implemented as a microelectromechanical system (MEMS) sensor. Each of first gravity sensor 76 and second gravity sensor 78 may be placed at the center or any portion of foot placement section 74. In some aspects, each of first gravity sensor 76 and second gravity sensor 78 may be or may include a pressure sensor.

Central control module 79 may include an accelerometer, a gyroscope sensor, a power management unit (PMU), Brushless DC (BLDC) Motor Driver Motor drivers, a microcontroller or a central processing unit, and miscellaneous sub-modules, such as wireless communication modules (e.g., Bluetooth or WIFI communication modules). In some embodiments, each of the accelerometer and the gyroscope sensor is capable of generating 3-axis outputs in the x, y, and z directions as illustrated in FIG. 7 and therefore the set of position sensors generates a combined 6-axis positional outputs. For example, an accelerometer sensor generates outputs of linear accelerations in the x, y, and z directions, and a gyroscope sensor generates outputs of rotational velocity with respect to the x, y, and z directions.

The accelerometer and the gyroscope sensor can be implemented as a microelectromechanical system (MEMS) sensor, such as an integrated MEMS sensor module.

Figure 8:
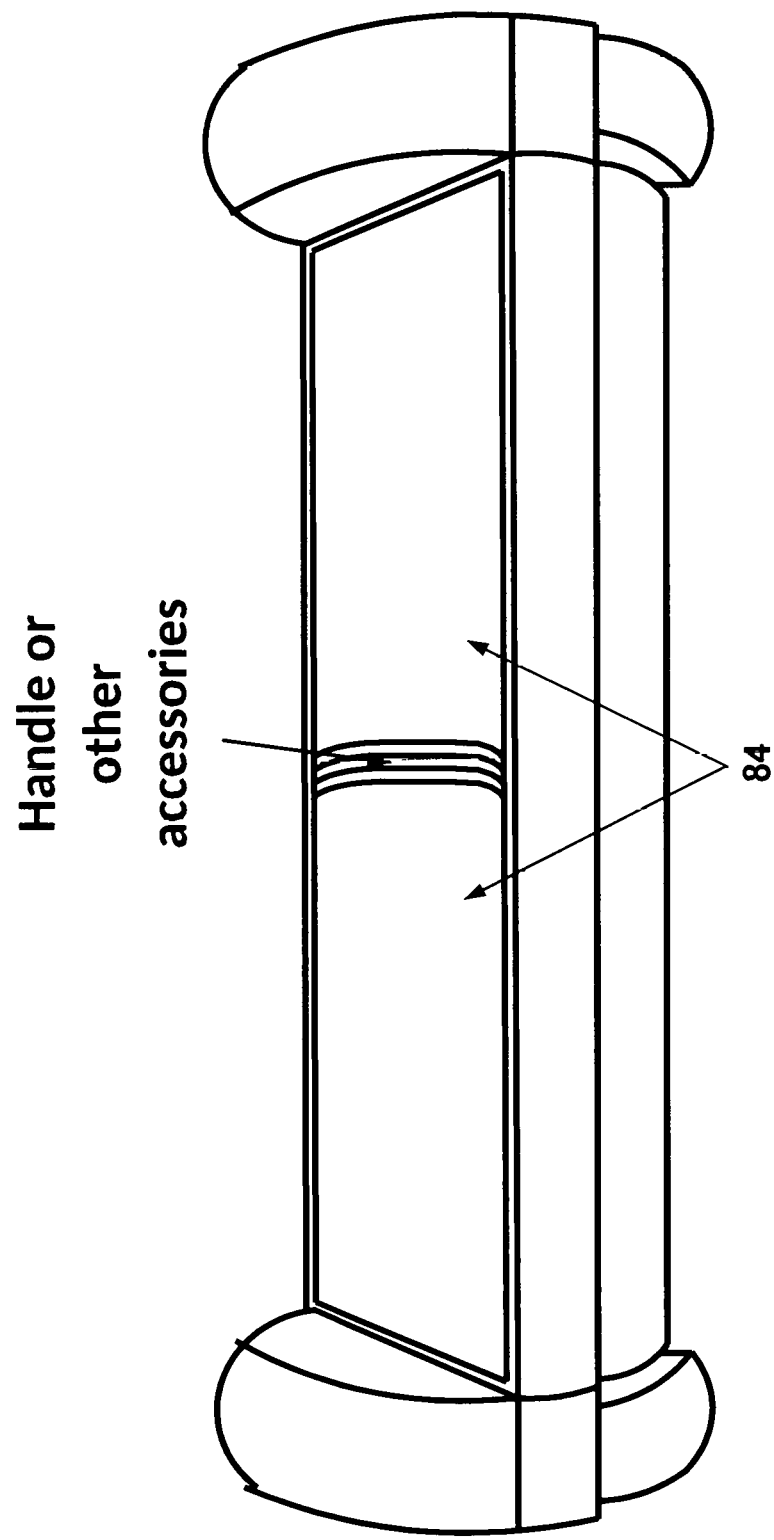
FIG. 8 illustrates an example of a two-wheel self-balancing vehicle with one or more gravity sensors according to one embodiment of the present disclosure.

FIG. 8 illustrates an example of a two-wheel self-balancing vehicle 800 with one or more gravity sensors according to one embodiment of the present disclosure. Two-wheel self-balancing vehicle 800 with one or more gravity sensors of the second embodiment includes two-wheel self-balancing vehicle 700 with one or more gravity sensors shown in FIG. 7. Not all of the depicted components may be used, however, and one or more implementations may include additional components not shown in the figure. Variations in the arrangement and type of the components may be made without departing from the scope of the subject technology. Additional components, different components, or fewer components may be provided.

As shown FIG. 8, a handle or other accessories 82 may be installed on the center or any portion of foot placement section 84. Handle or other accessories 82 may or may not be used for control purposes. Handle or other accessories 82 may add more utilities or aesthetic features to two-wheel self-balancing vehicle 800 with one or more gravity sensors, thus greatly enhancing the user experience. For example, the other accessories may include pockets for storing personal belongings, spaces for cameras or camera mounts, additional temperature, humidity, or environmental sensors, and so forth. In some embodiments, the cameras may also provide additional positional and control sensing signals to central control module 79 for safety and operability purposes. For example, the cameras may capture images or video during operation of two-wheel self-balancing vehicle 800 with one or more gravity sensors, and the videos or images may provide collision avoidance opportunities to the user. Further, in some embodiments, the videos or images may be automatically uploaded for surveillance or security purposes.

Figure 9:
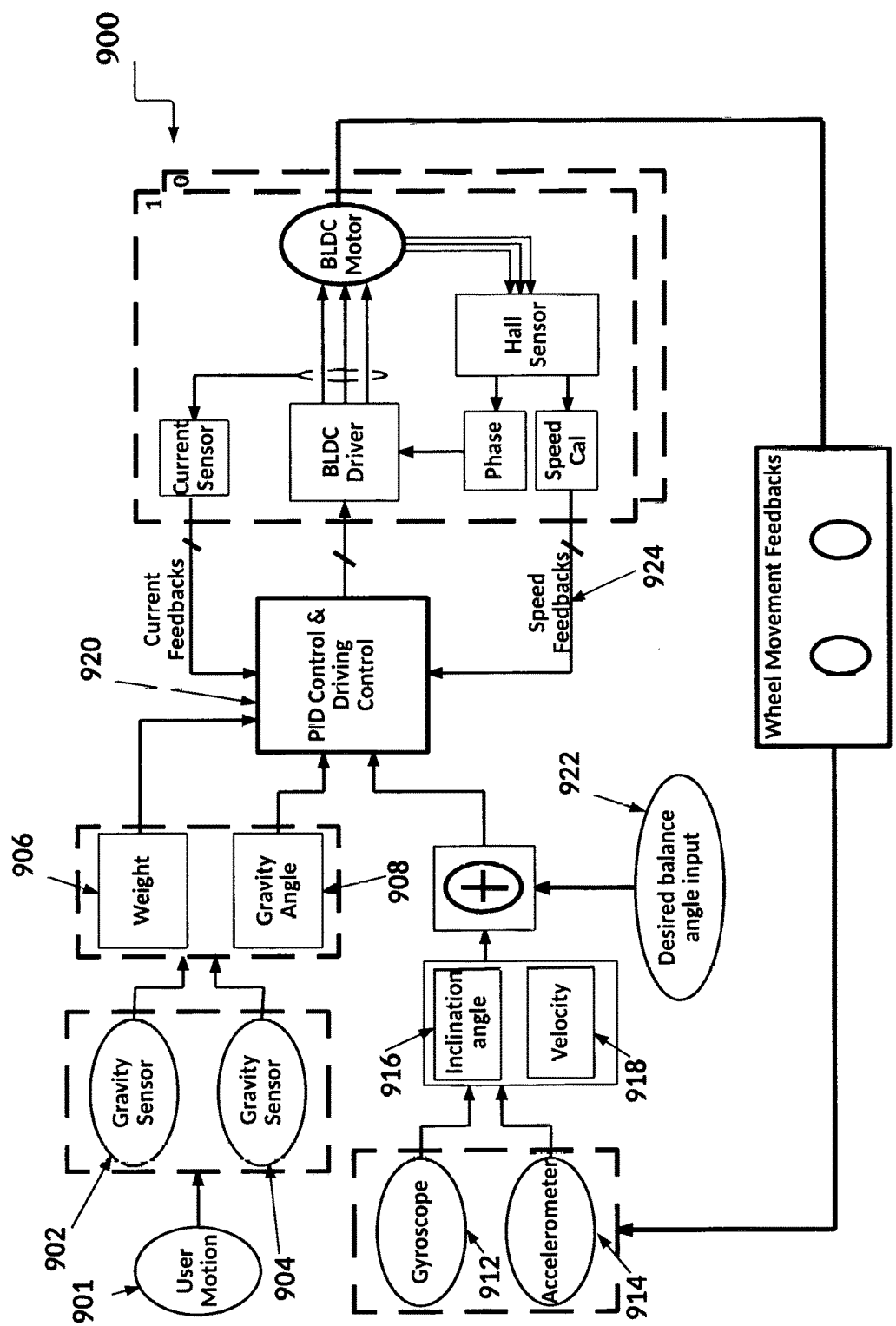
FIG. 9 illustrates a control diagram of a two-wheel self-balancing vehicle with one or more gravity sensors according to one embodiment of the present disclosure.

FIG. 9 illustrates a control diagram 900 of two-wheel self-balancing vehicle 700 with one or more gravity sensors according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 9, PID and driving control block 920 may receive gravity angle signal 908 computed from outputs of first gravity sensor 76 and second gravity sensor 78, and a processed inclination angle signal. The processed inclination angle signal may be generated by comparing an inclination angle signal 916 with a desired balance angle input 922. Desired balance angle input 922 may include a predetermined desired balance angle of two-wheel self-balancing vehicle 700 with one or more gravity sensors, and the predetermined desired balance angle may be a constant. Alternatively or in addition, desired balance angle input 922 may include a desired balance angle of two-wheel self-balancing vehicle 700 with one or more gravity sensors, and the desired balance angle may be a function of the speeds of first wheel with DC motor 70 and/or second wheel with DC motor 72.

Inclination angle signal 916 may be generated by an accelerometer 914 and a gyroscope 912. In some aspects, accelerometer 914 and gyroscope 912 may be included in central control module 79 shown in FIG. 7.

PID and driving control block 920 may generate one or more movement control signals to drive first wheel with DC motor 70 and second wheel with DC motor 72 separately to balance two-wheel self-balancing vehicle 700 with one or more gravity sensors. In some embodiments, the one or more movement control signals may include one or more adjusted angles for foot placement section 74 and/or one or more adjusted speeds based on the environment. The one or more adjusted angles may prevent the user from falling off of two-wheel self-balancing vehicle 700 with one or more gravity sensors during operation, especially during acceleration and deceleration. The one or more adjusted speeds may be calculated by central control module 79 based on contextual information including for example, environmental sensor data, camera input, and adjusted speed may be implemented automatically. The one or more adjusted speeds may provide additional safety measures to users during operation of the two-wheel self-balancing vehicle 700 with one or more gravity sensors.

Weight information 906 generated by gravity sensors 902 and 904 may be sent to PID and driving control block 920 to adjust the control parameter as a function of the weight information 906 to optimize the performance of two-wheel self-balancing vehicle 700 with one or more gravity sensors. In some aspects, two-wheel self-balancing vehicle 700 with one or more gravity sensors may be able to support a wider range of the weight thereon with a better driving experience.

FIGS. 10A-10D illustrate turning control examples of two-wheel self-balancing vehicle 700 with one or more gravity sensors. Two-wheel self-balancing vehicle 700 with one or more gravity sensors may be controlled by control diagram 900 shown in FIG. 9. As shown in FIGS. 10A-10D, x, y, and z directions are illustrated the same as illustrated in FIG. 7.

A gravity angle may be calculated as the difference of a sensed gravity from first gravity sensor 76 and a sensed gravity from second gravity sensor 78. For example, a gravity angle may be negative, calculated based on the sensed gravity of first gravity sensor 76 is less than a sensed gravity from second gravity sensor 78. A gravity angle may be positive, calculated based on the sensed gravity of first gravity sensor 76 is larger than a sensed gravity from second gravity sensor 78. A gravity angle may be zero based on the sensed gravity of first gravity sensor 76 is substantially equal to a sensed gravity from second gravity sensor 78.

As described with reference to FIG. 7, each of the accelerometer and the gyroscope sensor is capable of generating 3-axis outputs in the x, y, and z directions as illustrated. An inclination angle (e.g., inclination angle 916) may be computed from accelerometer 914 and gyroscope 912. An inclination angle may be an angle between the plane of foot placement section 74 and a horizontal plane which is perpendicular to the gravitational field pointing downwards along the z-axis. The inclination angle may be calculated as an angle between a gravitational vector of foot placement section 74 and the gravitational field pointing downwards along the z-axis. The inclination angle may be calculated from inclination angle signal 916. For example, an inclination angle may be negative, calculated based on the angle between the plane of foot placement section 74 and the gravitational field pointing downwards along the z-axis is smaller than 90 degrees. An inclination angle may be positive, calculated based on the angle between the plane of foot placement section 74 and the gravitational field pointing downwards along the z-axis is larger than 90 degrees. An inclination angle may be zero, calculated based on the angle between the plane of foot placement section 74 and the gravitational field pointing downwards along the z-axis is 90 degrees.

The gravity angle may be combined with inclination angle to drive first wheel with DC motor 70 and second wheel with DC motor 72 to turn two-wheel self-balancing vehicle 700 to different moving directions according to a movement control diagram shown in FIG. 11.

Figure 10A:
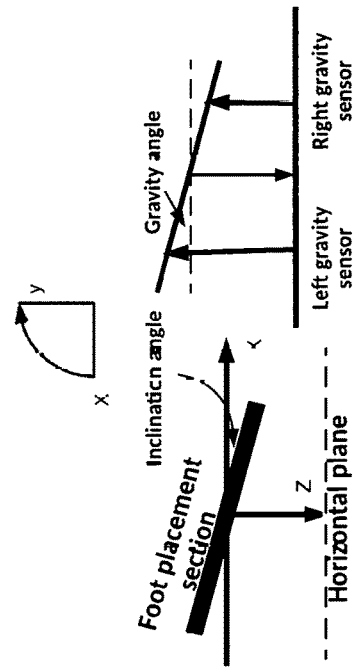
FIGS. 10A-10D illustrate turning control examples of a two-wheel self-balancing vehicle with one or more gravity sensors.
Figure 10B:
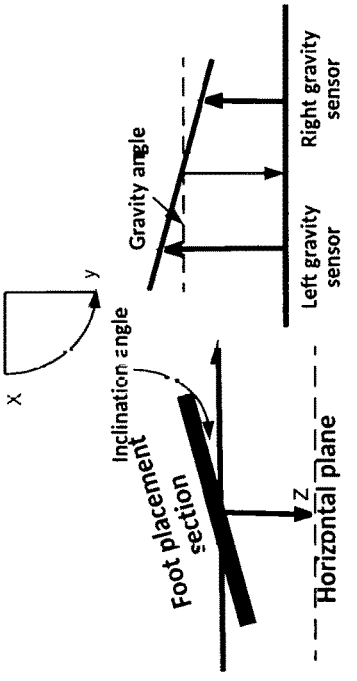
Figure 10C:
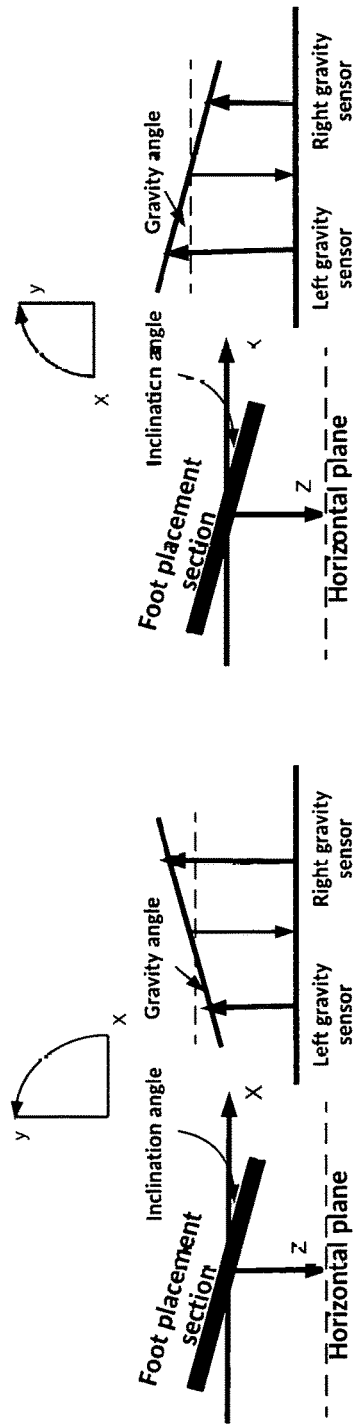
Figure 10D:
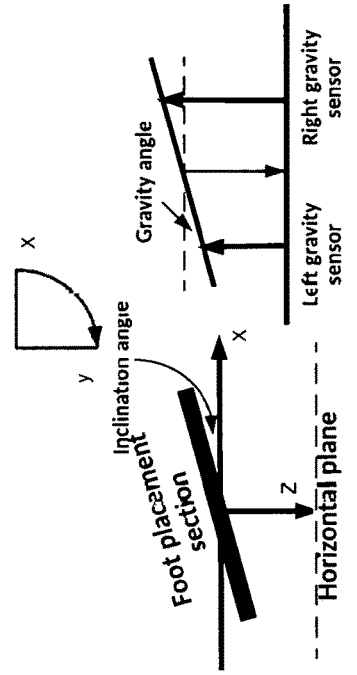

As shown in FIG. 10A, first wheel with DC motor 70 and second wheel with DC motor 72 may be configured to turn two-wheel self-balancing vehicle 700 left-forward based on a negative gravity angle and a negative inclination angle. As shown in FIG. 10B, first wheel with DC motor 70 and second wheel with DC motor 72 may be configured to turn two-wheel self-balancing vehicle 700 right-forward based on a positive gravity angle and a negative inclination angle. As shown in FIG. 10C, first wheel with DC motor 70 and second wheel with DC motor 72 may be configured to turn two-wheel self-balancing vehicle 700 left-backward based on a negative gravity angle and a positive inclination angle. As shown in FIG. 10D, first wheel with DC motor 70 and second wheel with DC motor 72 may be configured to turn two-wheel self-balancing vehicle 700 right-backward based on a positive gravity angle and a positive inclination angle.

FIG. 11 illustrates diagrammatically of movement control of the wheels of the embodiment of FIGS. 10A-10D.

Figure 12:
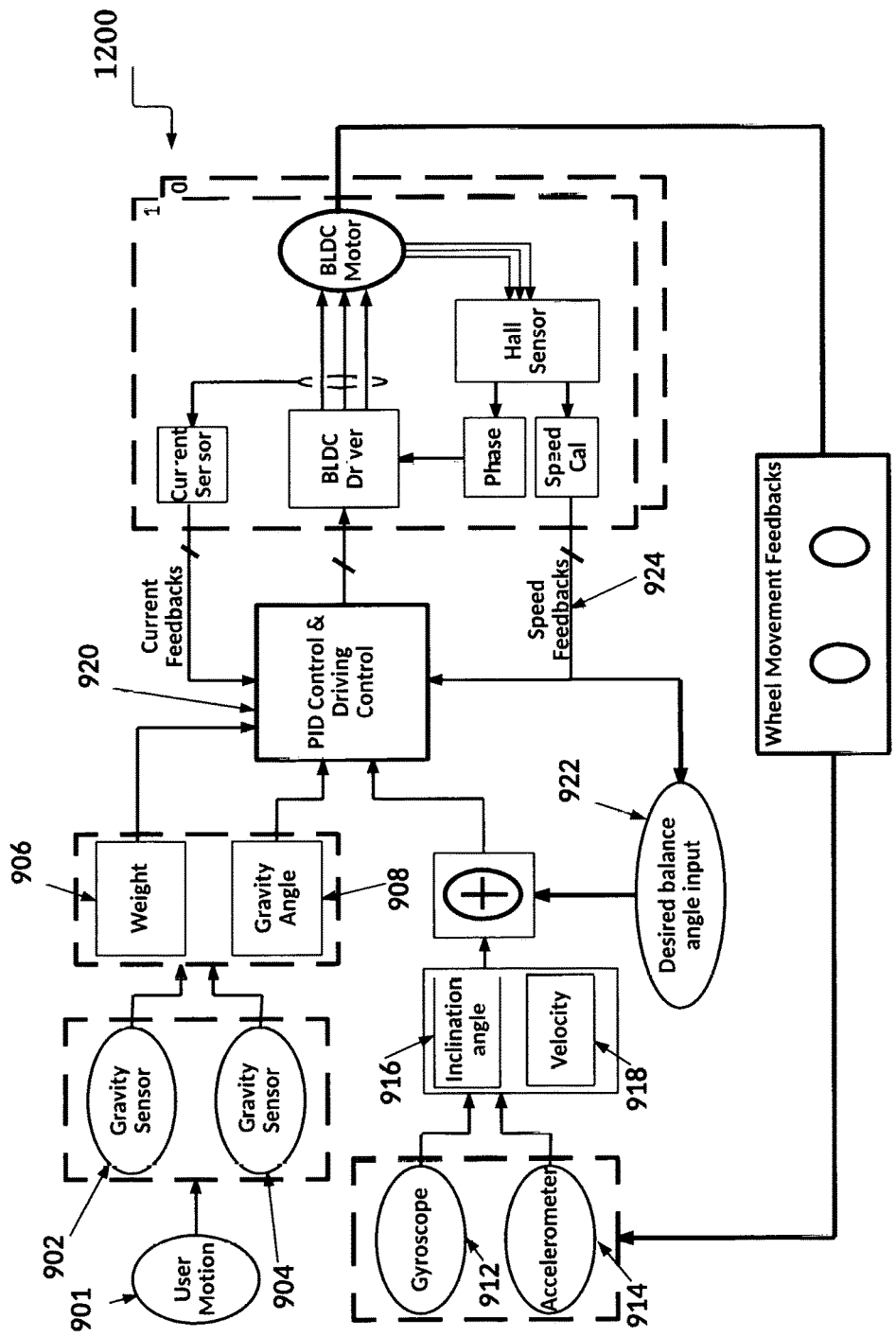
FIG. 12 illustrates a control diagram of a two-wheel self-balancing vehicle with one or more gravity sensors according to one embodiment of the present disclosure.

FIG. 12 illustrates a control diagram 1200 of two-wheel self-balancing vehicle 700 with one or more gravity sensors according to one embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Control diagram 1200 may include control diagram 900 shown in FIG. 9. As shown in FIG. 12, desired balance angle input 922 may be based on a function of speed feedback signal 924. Speed feedback signal 924 may include the speed of first wheel with DC motor 70 and/or the speed of second wheel with DC motor 72.

Figure 13:
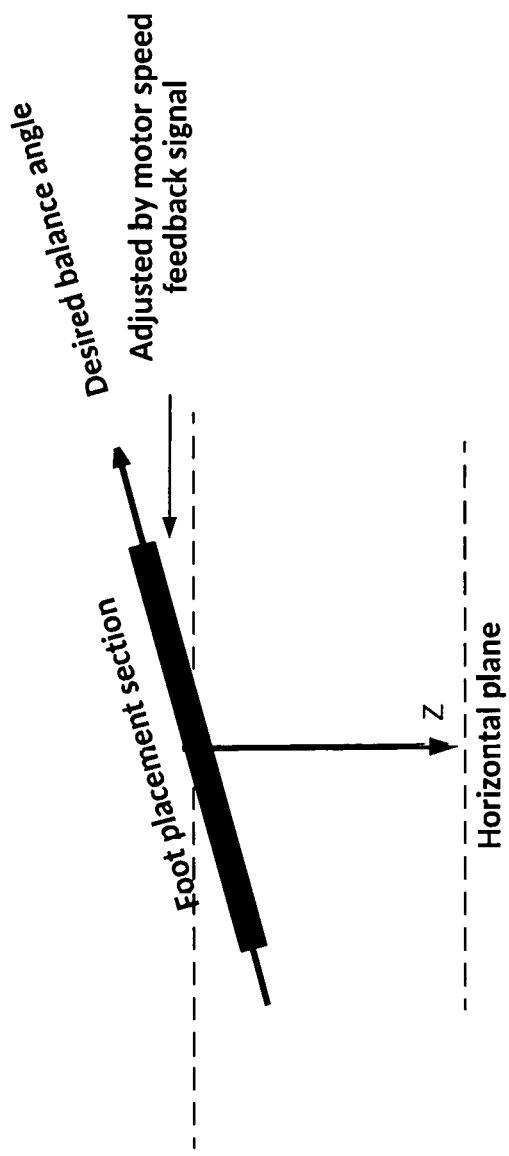
FIG. 13 illustrates an example of a desired balance angle of two-wheel self-balancing vehicle with one or more gravity sensors.

FIG. 13 illustrates an example of a desired balance angle of two-wheel self-balancing vehicle 700 with one or more gravity sensors. As shown in FIG. 13, a desired balance angle may be an angle between the plane of foot placement section 74 and a horizontal plane which is perpendicular to the gravitational field pointing downwards along the z-axis. The inclination angle may be calculated as an angle between a gravitational vector of foot placement section 74 and the gravitational field pointing downwards along the z-axis. As shown in FIG. 13, x, y, and z directions are illustrated the same as illustrated in FIG. 7.

As described with reference to FIG. 12, a desired balance angle of foot placement section 74 can be dynamically adjusted as a function of a motor and wheel speed by receiving the speed feedback signals 924 from first wheel with DC motor 70 and/or the speed of second wheel with DC motor 72. In some embodiments, the desired balance angle may be dynamically adjusted based on a plurality of other factors, such as the motor and wheel speed, the terrain ahead of the user or surrounding the user as determined based on camera data, environmental information regarding weather, temperature, humidity from environmental sensors, and/or location information based on Global Positioning System (GPS) data.

To further improve the turning mobility, each of first gravity sensor 76 and second gravity sensor 78 may include an array of gravity sensors.

Figure 14:
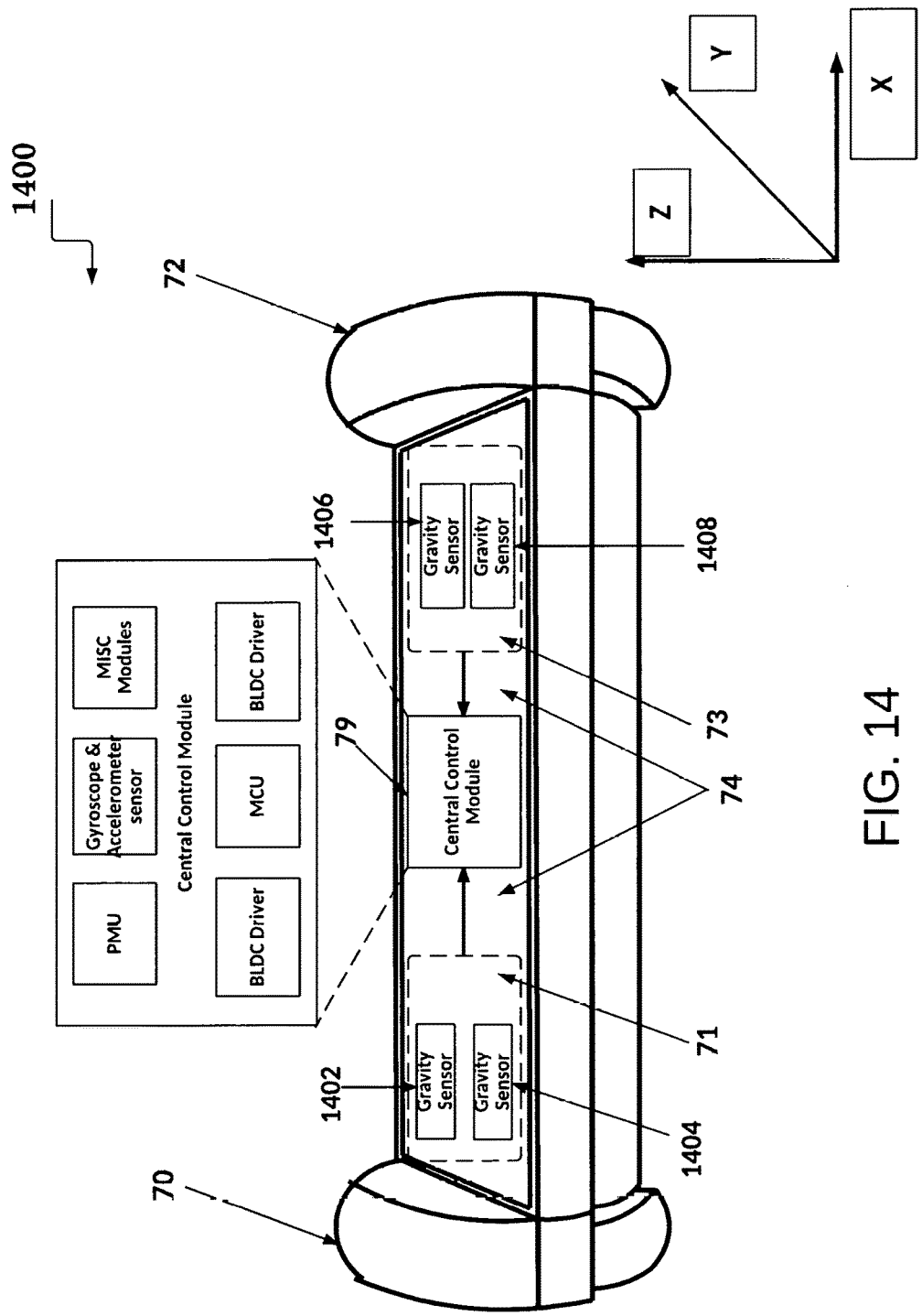
FIG. 14 illustrates an example of a two-wheel self-balancing vehicle with one or more gravity sensors according to another embodiment of the present disclosure.

FIG. 14 illustrates an example of a two-wheel self-balancing vehicle 1400 with one or more gravity sensors according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Two-wheel self-balancing vehicle 1400 with one or more gravity sensors comprises a first wheel with DC motor 70, a second wheel with DC motor 72, a foot placement section 74, a gravity sensor 1402, a gravity sensor 1404, a gravity sensor 1406, a gravity sensor 1408, and a central control module 79. First wheel with DC motor 70, a second wheel with DC motor 72, a foot placement section 74, and a central control module 79 are described in details with reference to FIG. 7. As shown in FIG. 14, x, y, and z directions are illustrated the same as illustrated in FIG. 7.

As described above with reference to FIG. 7, foot placement section 74 may be one section or area comprising a first portion 71 and a second portion 73 located on the same plane to offer more design flexibility in terms of mechanical architecture and exterior design. In some aspects, first portion 71 may be a portion between the center axes of two-wheel self-balancing vehicle 700 with one or more gravity sensors and first wheel with DC motor 70. Second portion 73 may be a portion between the center axes of two-wheel self-balancing vehicle 700 with one or more gravity sensors and second wheel with DC motor 72. For example, a user may place his/her left foot on first portion 71 and his/her right foot on second portion 73.

In some embodiments, first portion 71 may include gravity sensor 1402 and gravity sensor 1404. Second portion 73 may include gravity sensor 1406 and gravity sensor 1408.

Each of gravity sensors 1402, 1404, 1406 and 1408 may sense the weight and gravity angles of a user when he or she stands on foot placement section 74. Each of gravity sensors 1402, 1404, 1406 and 1408 may be implemented as a microelectromechanical system (MEMS) sensor. Each of gravity sensors 1402, 1404, 1406 and 1408 may be placed at the center or any portion of foot placement section 74. In some aspects, each of gravity sensors 1402, 1404, 1406 and 1408 may be or may include a pressure sensor.

As shown in FIG. 14, gravity sensor 1402 may be located at a left-front location of foot placement section 74. Gravity sensor 1404 may be located at a left-rear location of foot placement section 74. Gravity sensor 1406 may be located at a right-front location of foot placement section 74. Gravity sensor 1408 may be located at a right-rear location of foot placement section 74. In this implementation, much more flexible turning movement can be achieved by using three-dimensional gravity angle signals from gravity sensors 1402, 1404, 1406 and 1408 at different locations.

Figure 15:
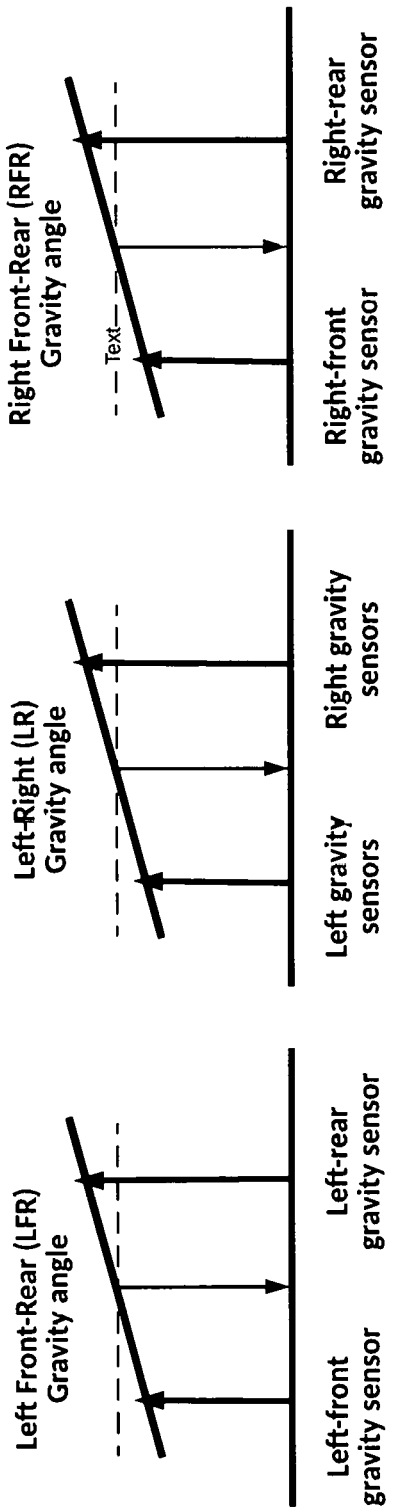
FIG. 15 illustrates an example three-dimensional gravity sensing scheme of a two-wheel self-balancing vehicle with one or more gravity sensors according to another embodiment of the present disclosure.

FIG. 15 illustrates an example three-dimensional gravity sensing scheme of two-wheel self-balancing vehicle 1400 with one or more gravity sensors according to another embodiment of the present disclosure.

As shown in FIG. 15, Left Front-Rear (LFR) gravity angle, Right Front-Rear (RFR) gravity angle, and Left-Right (LR) gravity angle may be obtained from gravity sensors 1402, 1404, 1406 and 1408 shown in FIG. 14.

LFR gravity angle can be obtained as the difference of a sensed gravity from a left-front gravity sensor (e.g., gravity sensor 1402) and a sensed gravity from a left-rear gravity sensor (e.g., gravity sensor 1404). For example, LFR gravity angle may be negative, calculated based on the sensed gravity of gravity sensor 1402 is less than a sensed gravity from gravity sensor 1404. LFR gravity angle may be positive, calculated based on the sensed gravity of gravity sensor 1402 is larger than a sensed gravity from gravity sensor 1404. LFR gravity angle may be zero based on the sensed gravity of gravity sensor 1402 is substantially equal to a sensed gravity from gravity sensor 1406.

RFR gravity angle may be calculated as the difference of a sensed gravity from a right-front gravity sensor (e.g., gravity sensor 1406) and a sensed gravity from a right-rear gravity sensor (e.g., gravity sensor 1408). For example, RFR gravity angle may be negative, calculated based on the sensed gravity of gravity sensor 1406 is less than a sensed gravity from gravity sensor 1408. RFR gravity angle may be positive, calculated based on the sensed gravity of gravity sensor 1406 is larger than a sensed gravity from gravity sensor 1408. RFR gravity angle may be zero based on the sensed gravity of gravity sensor 1406 is substantially equal to a sensed gravity from gravity sensor 1408.

LR gravity angle may be calculated as the difference of the output sum of the left gravity sensors (e.g., output sum of gravity sensor 1402 and gravity sensor 1404) and output sum of the right gravity sensors (e.g., output sum of gravity sensor 1406 and gravity sensor 1408). For example, LR gravity angle may be negative, calculated based on the output sum of left gravity sensors is less than the output sum of from the right gravity sensors. LR gravity angle may be positive, calculated based on calculated based on the output sum of left gravity sensors is larger than the output sum of from the right gravity sensors. LR gravity angle may be zero, calculated based on the output sum of left gravity sensors is substantially equal to the output sum of from the right gravity sensors.

FIGS. 16A-16F illustrate turning control examples of two-wheel self-balancing vehicle 1400 with one or more gravity sensors. As shown in FIGS. 16A-16F, x, y, and z directions are illustrated the same as illustrated in FIG. 14.

Figure 16A:
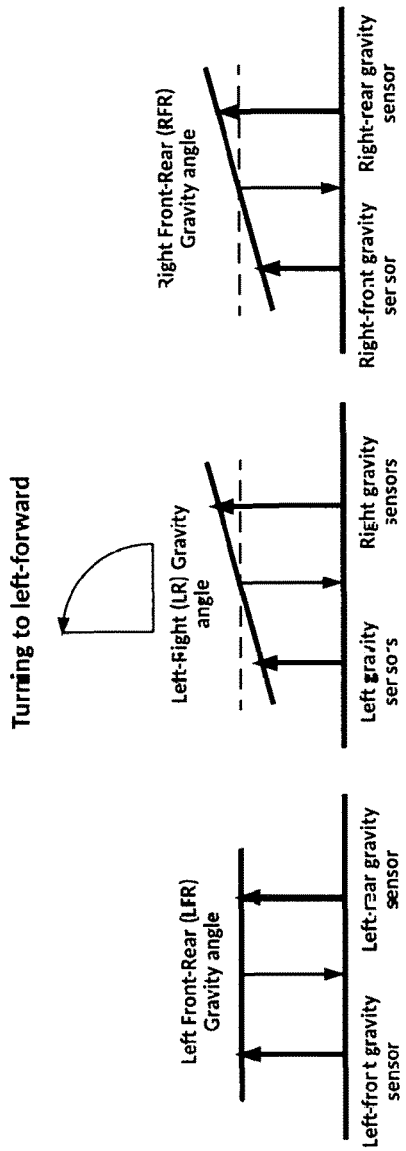
Figure 16B:
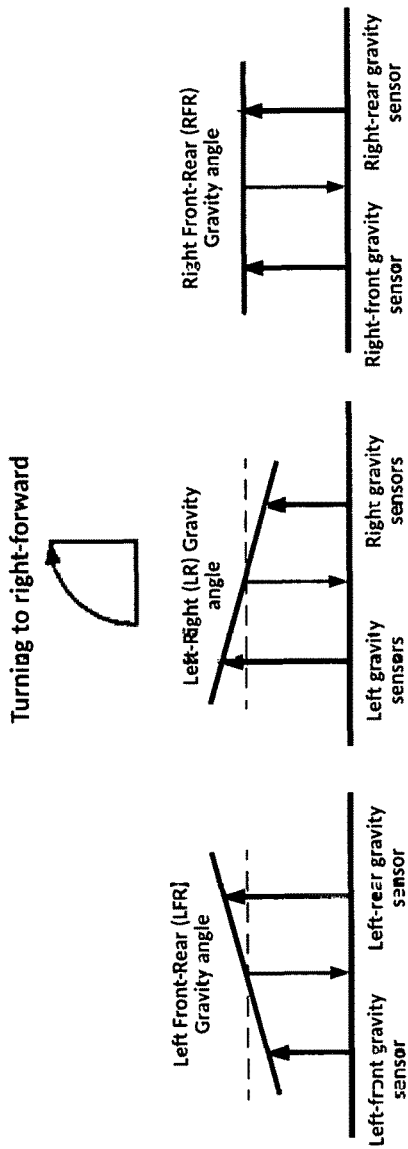

As shown in FIG. 16A, first wheel with DC motor 70 and second wheel with DC motor 72 may be configured to turn two-wheel self-balancing vehicle 1400 left-forward based on a negative LR gravity angle, a negative RFR gravity angle, and a zero LFR gravity angle. As shown in FIG. 16B, first wheel with DC motor 70 and second wheel with DC motor 72 may be configured to turn two-wheel self-balancing vehicle 1400 right-forward based on a positive LR gravity angle, a negative LFR gravity angle, and a zero RFR gravity angle. As shown in FIG. 16C, first wheel with DC motor 70 and second wheel with DC motor 72 may be configured to turn two-wheel self-balancing vehicle 1400 left-backward based on a negative LR gravity angle, a positive RFR gravity angle, and a zero LFR gravity angle. As shown in FIG. 16D, first wheel with DC motor 70 and second wheel with DC motor 72 may be configured to turn two-wheel self-balancing vehicle 1400 right-backward based on a positive LR gravity angle, a positive LFR gravity angle and a zero RFR gravity angle. As shown in FIG. 16E, first wheel with DC motor 70 and second wheel with DC motor 72 may be configured to turn two-wheel self-balancing vehicle 1400 anti-clockwise based on a positive LFR gravity angle, a negative RFR gravity angle, and a zero LR gravity angle. As shown in FIG. 16F, first wheel with DC motor 70 and second wheel with DC motor 72 may be configured to turn two-wheel self-balancing vehicle 1400 clockwise based on a negative LFR gravity angle, a positive RFR gravity angle, and a zero LR gravity angle.

In some embodiments, the higher dimensionality of gravity sensors 1402, 1404, 1406 and 1408 may offer a more complete set of control possibilities, and enable the user to have an accurate control of the movement of two-wheel self-balancing vehicle 1400 based on his or her own body movement. Two-wheel self-balancing vehicle 1400 may respond faster and more precisely to the gesture of the user.

Figure 17:
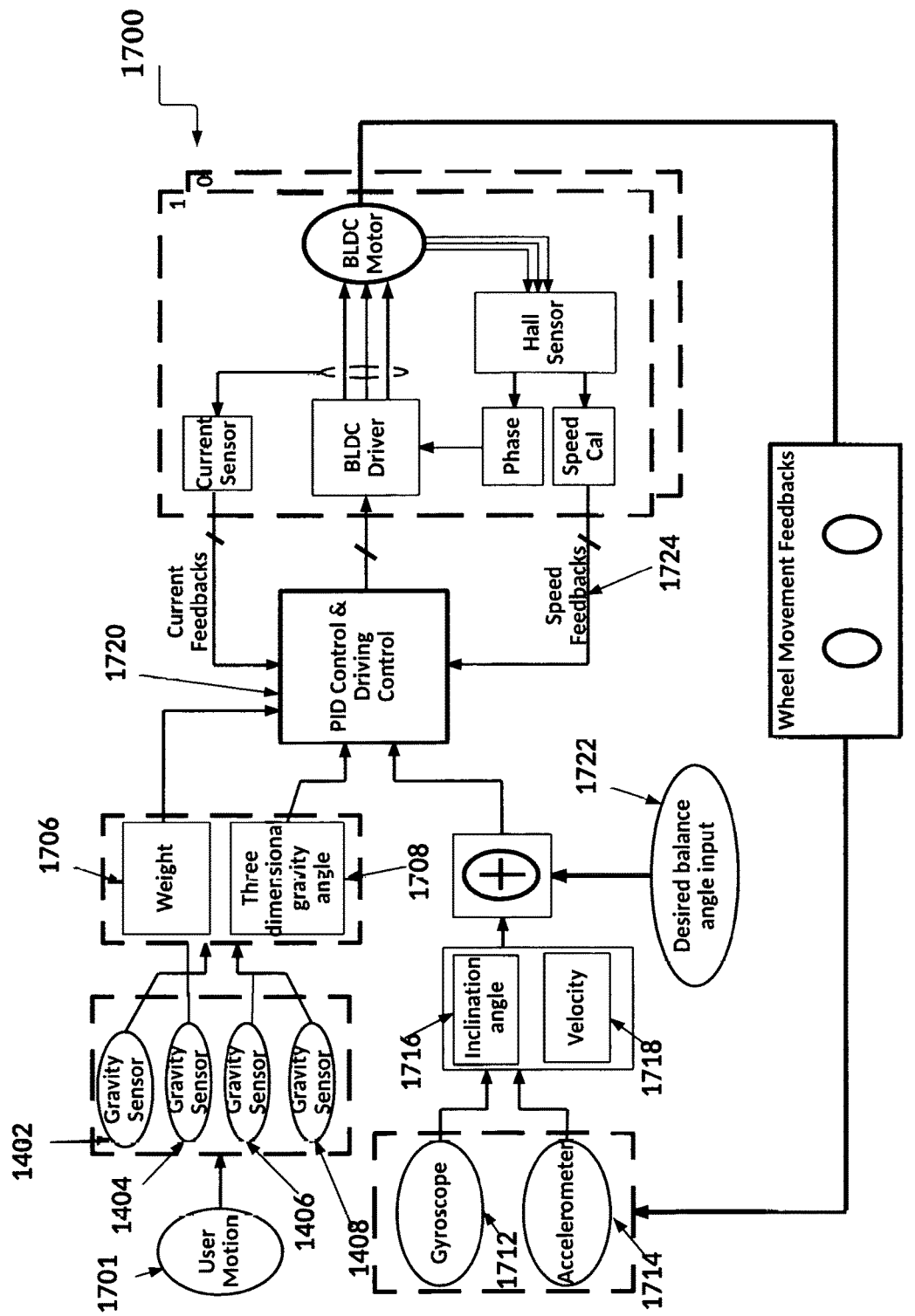
FIG. 17 illustrates a control diagram of a two-wheel self-balancing vehicle with one or more gravity sensors according to another embodiment of the present disclosure.

FIG. 17 illustrates a control diagram 1700 of two-wheel self-balancing vehicle 1400 with one or more gravity sensors according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 17, PID and driving control block 1720 may receive three-dimensional gravity angle signal 1708 computed from outputs of gravity sensors 1402, 1404, 1406 and 1408, and a processed inclination angle signal. The processed inclination angle signal may be generated by comparing an inclination angle signal 1716 with a desired balance angle input 1722. Desired balance angle input 1722 may include a predetermined desired balance angle of two-wheel self-balancing vehicle 1400 with one or more gravity sensors, and the predetermined desired balance angle may be a constant. Alternatively or in addition, desired balance angle input 1722 may include a desired balance angle of two-wheel self-balancing vehicle 1400 with one or more gravity sensors, and the desired balance angle may be a function of the speeds of first wheel with DC motor 70 and/or second wheel with DC motor 72.

Inclination angle signal 1716 may be generated by an accelerometer 1714 and a gyroscope 1712. In some aspects, accelerometer 1714 and gyroscope 1712 may be included in central control module 79 shown in FIG. 1400.

PID and driving control block 1720 may generate one or more movement control signals to drive first wheel with DC motor 70 and second wheel with DC motor 72 separately to balance two-wheel self-balancing vehicle 1400 with one or more gravity sensors. In some embodiments, the one or more movement control signals may include one or more adjusted angles for foot placement section 74 and/or one or more adjusted speeds based on the environment. The one or more adjusted angles may prevent the user from falling off of two-wheel self-balancing vehicle 1400 with one or more gravity sensors during operation, especially during acceleration and deceleration. The one or more adjusted speeds may be calculated by central control module 79 based on contextual information including for example, environmental sensor data, camera input, and adjusted speed may be implemented automatically. The one or more adjusted speeds may provide additional safety measures to users during operation of the two-wheel self-balancing vehicle 1400 with one or more gravity sensors.

Weight information 1706 generated by gravity sensors 1402, 1404, 1406 and 1408 may be sent to PID and driving control block 1720 to adjust the control parameter as a function of the weight information 1706 to optimize the performance of two-wheel self-balancing vehicle 1400 with one or more gravity sensors. In some aspects, two-wheel self-balancing vehicle 1400 with one or more gravity sensors may be able to support a wider range of the weight thereon with a better driving experience.

Figure 18:
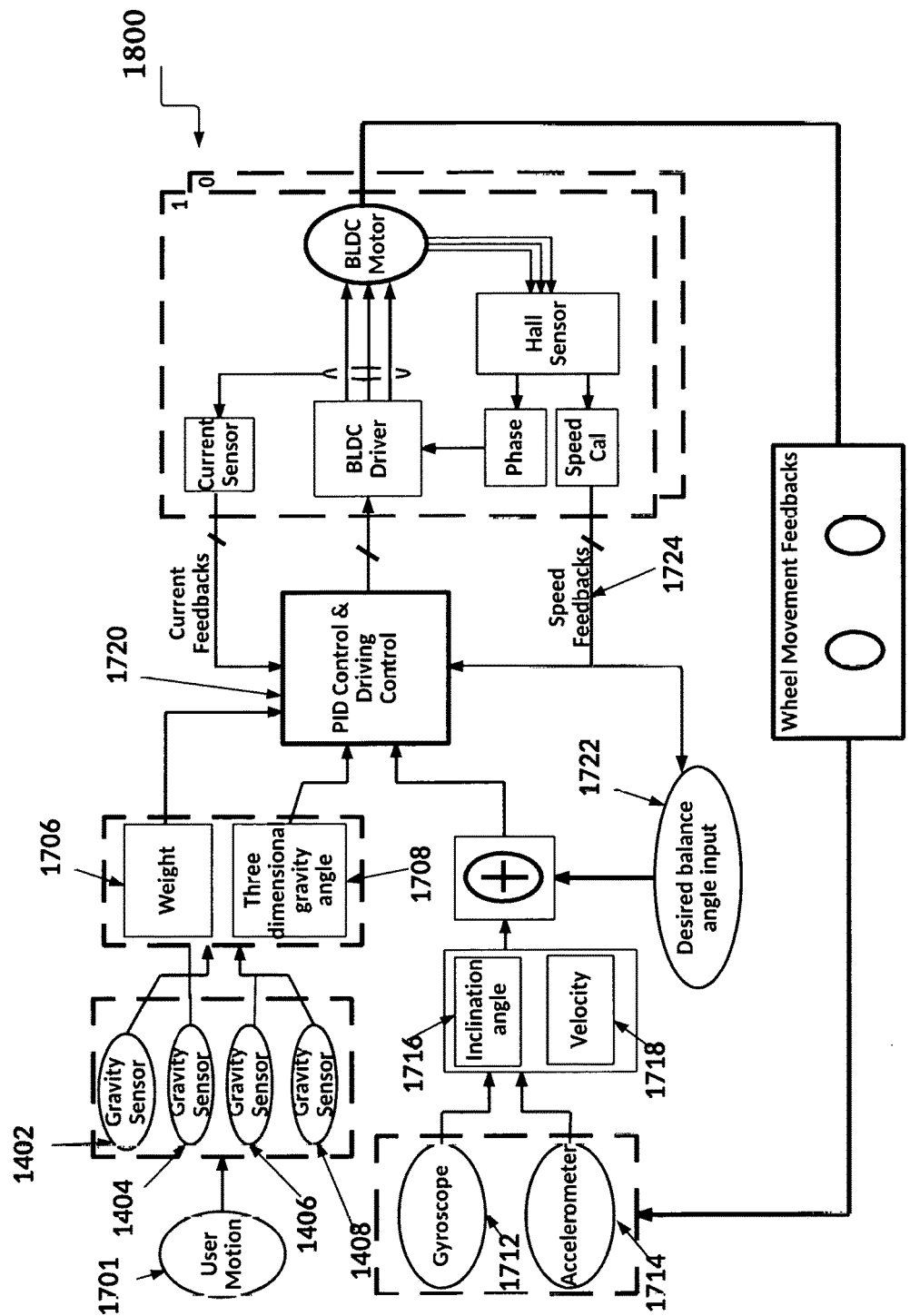
FIG. 18 illustrates a control diagram of a two-wheel self-balancing vehicle with one or more gravity sensors according to another embodiment of the present disclosure.

FIG. 18 illustrates a control diagram 1800 of two-wheel self-balancing vehicle 1400 with one or more gravity sensors according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Control diagram 1800 may include control diagram 1700 shown in FIG. 7. As shown in FIG. 18, desired balance angle input 1722 may be based on a function of speed feedback signal 1724. Speed feedback signal 1724 may include the speed of first wheel with DC motor 70 and/or the speed of second wheel with DC motor 72.

Figure 19:
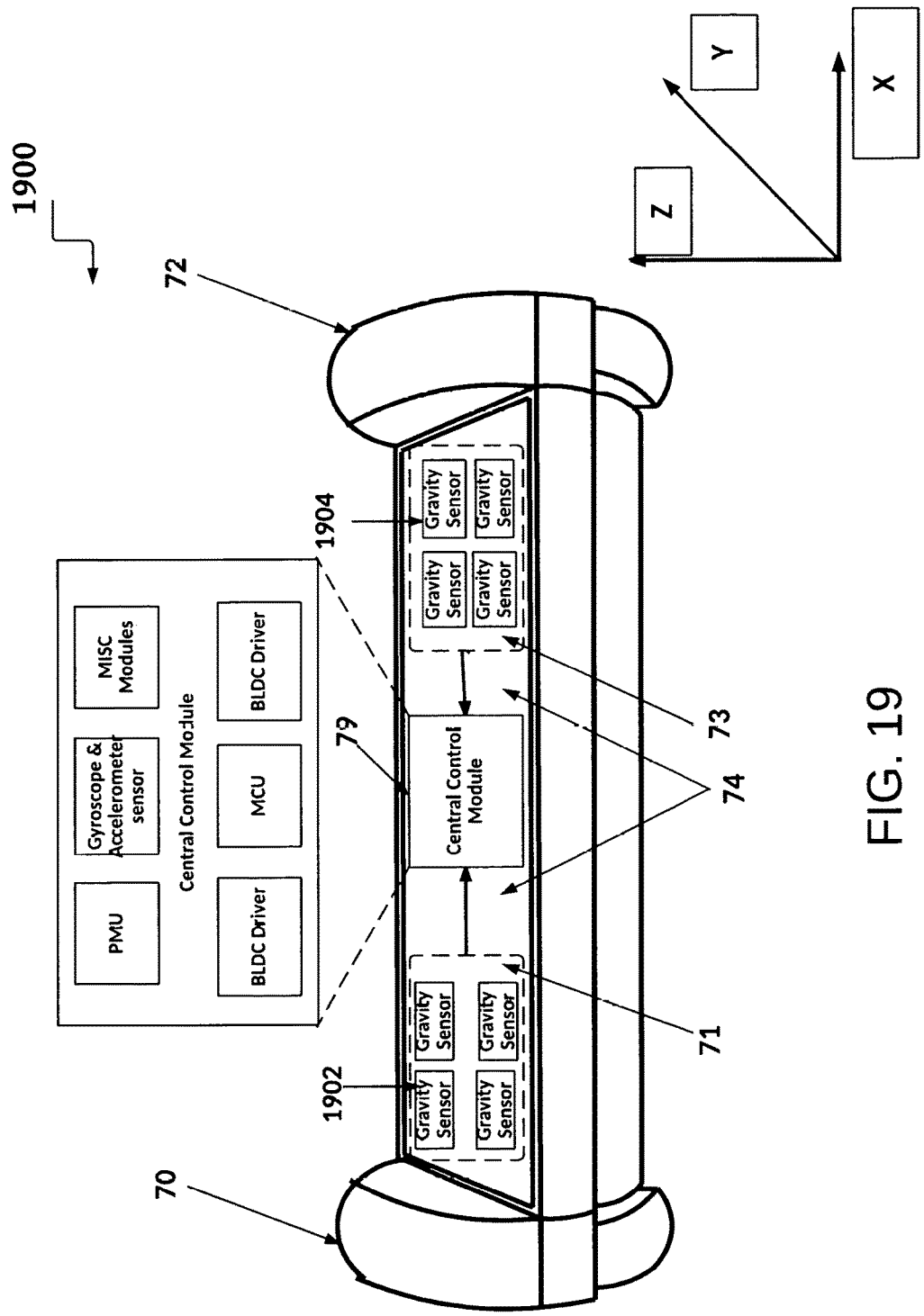
FIG. 19 illustrates an example of a two-wheel self-balancing vehicle with one or more gravity sensors according to another embodiment of the present disclosure.

FIG. 19 illustrates an example of a two-wheel self-balancing vehicle 1900 with one or more gravity sensors according to another embodiment of the present disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Two-wheel self-balancing vehicle 1900 with one or more gravity sensors comprises a first wheel with DC motor 70, a second wheel with DC motor 72, a foot placement section 74, a gravity sensor array 1902, a gravity sensor array 1904, and a central control module 79. First wheel with DC motor 70, a second wheel with DC motor 72, a foot placement section 74, and a central control module 79 are described in details with reference to FIG. 7. As shown in FIG. 14, x, y, and z directions are illustrated the same as illustrated in FIG. 7.

As described above with reference to FIG. 7, foot placement section 74 may be one section or area comprising a first portion 71 and a second portion 73 located on the same plane to offer more design flexibility in terms of mechanical architecture and exterior design. In some aspects, first portion 71 may be a portion between the center axes of two-wheel self-balancing vehicle 700 with one or more gravity sensors and first wheel with DC motor 70. Second portion 73 may be a portion between the center axes of two-wheel self-balancing vehicle 700 with one or more gravity sensors and second wheel with DC motor 72. For example, a user may place his/her left foot on first portion 71 and his/her right foot on second portion 73.

In some embodiments, first portion 71 may include gravity sensor array 1902. Second portion 73 may include gravity sensor array 1904. Each of gravity sensor array 1902 and gravity sensor array 1904 may an array of gravity sensors. Each sensor of gravity sensor array 1902 and gravity sensor array 1904 may sense the weight and gravity angles of a user when he or she stands on foot placement section 74. Each sensor of gravity sensor array 1902 and gravity sensor array 1904 may be implemented as a microelectromechanical system (MEMS) sensor. In some aspects, each sensor of gravity sensor array 1902 and gravity sensor array 1904 may be or may include a pressure sensor.

In some embodiments, additional types of sensors may be placed in first portion 71 and second portion 73 to provide additional sensing or control information. For example, sensors that detect outside temperature, body temperature, humidity, and/or other information may be installed. In addition, cameras or camera mounts may be installed in order to detect the surrounding environments or for sensing impending changes. In some embodiments, additional torque sensors may be installed to calculate the torque and send the signal to the on-board processors. In some embodiments, other equipment, such as GPS signal receivers, music players, pockets or slots for storage, and so forth, may be added.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A two-wheel, self-balancing vehicle comprising:
    a first wheel and a second wheel, the first wheel and the second wheel being spaced apart and substantially parallel to one another;
    a foot placement section connecting the first wheel and the second wheel;
    a set of position sensors in the foot placement section, the set of position sensors configured to generate inclination angle signals and velocity signals of the two-wheel, self-balancing vehicle;
    a first gravity sensor and a second gravity sensor in the foot placement section, the first gravity sensor and the second gravity sensor configured to generate weight signals and gravity angle signals;
    a control logic configured to output control signals that control the movement of the two-wheel, self-balancing vehicle in response to the inclination angle signals, the velocity signals, the weight signals, and the gravity angle signals.

2. The two-wheel, self-balancing vehicle of claim 1, wherein the set of position sensors comprises an accelerometer sensor and a gyroscope sensor.

3. The two-wheel, self-balancing vehicle of claim 1, wherein the first gravity sensor is located in the left part of the foot placement section and the second gravity sensor is located in the right part of the foot placement section.

4. The two-wheel, self-balancing vehicle of claim 1, wherein the control logic is configured to compare a desired balance angle of the two-wheel, self-balancing vehicle with the inclination angle signals.

5. The two-wheel, self-balancing vehicle of claim 4, wherein the desired balance angle is a function of a speed of the first wheel or the second wheel.

6. The two-wheel, self-balancing vehicle of claim 1, wherein the center portion of the foot placement section is attached to at least one sensor or at least one accessory.

7. The two-wheel, self-balancing vehicle of claim 6, wherein the at least one sensor includes at least one of a temperature sensor, a light sensor, a moisture sensor, or a location sensor.

8. The two-wheel, self-balancing vehicle of claim 6, wherein the at least one accessory includes at least one of a camera, a camera mount, or a storage component.

9. The two-wheel, self-balancing vehicle of claim 1, wherein a pole is attached to the center portion of the foot placement section.

10. The two-wheel, self-balancing vehicle of claim 1, wherein the foot placement section comprises one generally flat plane with room for accommodating two human feet.

11. The two-wheel, self-balancing vehicle of claim 1, wherein each of the first gravity sensor and the second gravity sensor senses a pressure of a human foot placed on the foot placement section.

12. The two-wheel, self-balancing vehicle of claim 1, further comprises a third gravity sensor and a fourth gravity sensor, wherein the first gravity sensor is located at the left front part of the foot placement section, the second gravity sensor is located at the left rear part of the foot placement section, the third gravity sensor is located at the right front of the foot placement section, and the fourth gravity sensor is located at the right rear of the foot placement section.

13. The two-wheel, self-balancing vehicle of claim 12, wherein the first, second, third and fourth gravity sensors are configured to generate three-dimensional gravity angle signals.

14. The two-wheel, self-balancing vehicle of claim 1, further comprises a gravity sensor array located in the left part of the foot placement section or the right part of the foot placement section.

* * * * *